(12) United States Patent
Koike et al.

(10) Patent No.: US 7,773,128 B2
(45) Date of Patent: Aug. 10, 2010

(54) IMAGING APPARATUS

(75) Inventors: Toru Koike, Tokyo (JP); Katsuyuki Onozawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 250 days.

(21) Appl. No.: 10/567,648

(22) PCT Filed: Jun. 7, 2005

(86) PCT No.: PCT/JP2005/010751

§ 371 (c)(1),
(2), (4) Date: Feb. 9, 2006

(87) PCT Pub. No.: WO2005/122563

PCT Pub. Date: Dec. 22, 2005

(65) Prior Publication Data

US 2008/0273095 A1    Nov. 6, 2008

(30) Foreign Application Priority Data

Jun. 10, 2004  (JP)  ............................. 2004-172998
Jun. 10, 2004  (JP)  ............................. 2004-173009

(51) Int. Cl.
H04N 5/76 (2006.01)
(52) U.S. Cl. .................. 348/231.9; 348/231.2
(58) Field of Classification Search .............. 348/231.2, 348/231.8, 231.9
See application file for complete search history.

(56) References Cited

U.S. PATENT DOCUMENTS 5,796,429 A * 8/1998 Suzuki et al. ............... 348/239
6,463,432 B1 * 10/2002 Murakawa ..................... 707/5
6,704,047 B1 3/2004 Tsutsui ..................... 348/231.7
6,816,633 B1 11/2004 Kusama et al.
6,897,894 B1 * 5/2005 Miyazawa ............... 348/231.8
7,236,193 B2 6/2007 Suemoto et al.
2002/0093574 A1 7/2002 Aoki et al.
2004/0012693 A1 1/2004 Hayashi .................... 348/231.2
2004/0062525 A1 4/2004 Hasegawa et al. ............. 386/69
2005/0110878 A1 5/2005 Dalton ..................... 348/231.2
2009/0002522 A1 * 1/2009 Murai ..................... 348/231.2

FOREIGN PATENT DOCUMENTS

| JP | 2000-76302 | 3/2000 |
| JP | 2001052011 A | 2/2001 |
| JP | 2001268508 A | 9/2001 |
| JP | 2002010196 A | 1/2002 |
| JP | 2002209132 A | 7/2002 |
| JP | 2002-369109 | 12/2002 |
| JP | 2003-319296 | 11/2003 |

OTHER PUBLICATIONS

Japanese Office Action dated Jan. 25, 2010 in corresponding Japanese Application No. 2004-173009.

* cited by examiner

Primary Examiner—John M Villecco
(74) Attorney, Agent, or Firm—Fitzpatrick, Cella, Harper & Scinto

(57) ABSTRACT

By connecting to or mounting a first storage medium that stores image data as a retrieval object (e.g. first memory card 121) and a second storage medium that stores a retrieve condition (e.g. non-volatile memory 111 or second memory card 122), an imaging apparatus 100 can store image data as a retrieval object and a retrieve condition on different storage medium. By replacing the first storage medium with a third storage medium, image retrieval can be executed for a plurality of storage medium using the same retrieve condition.

9 Claims, 24 Drawing Sheets

F I G. 18
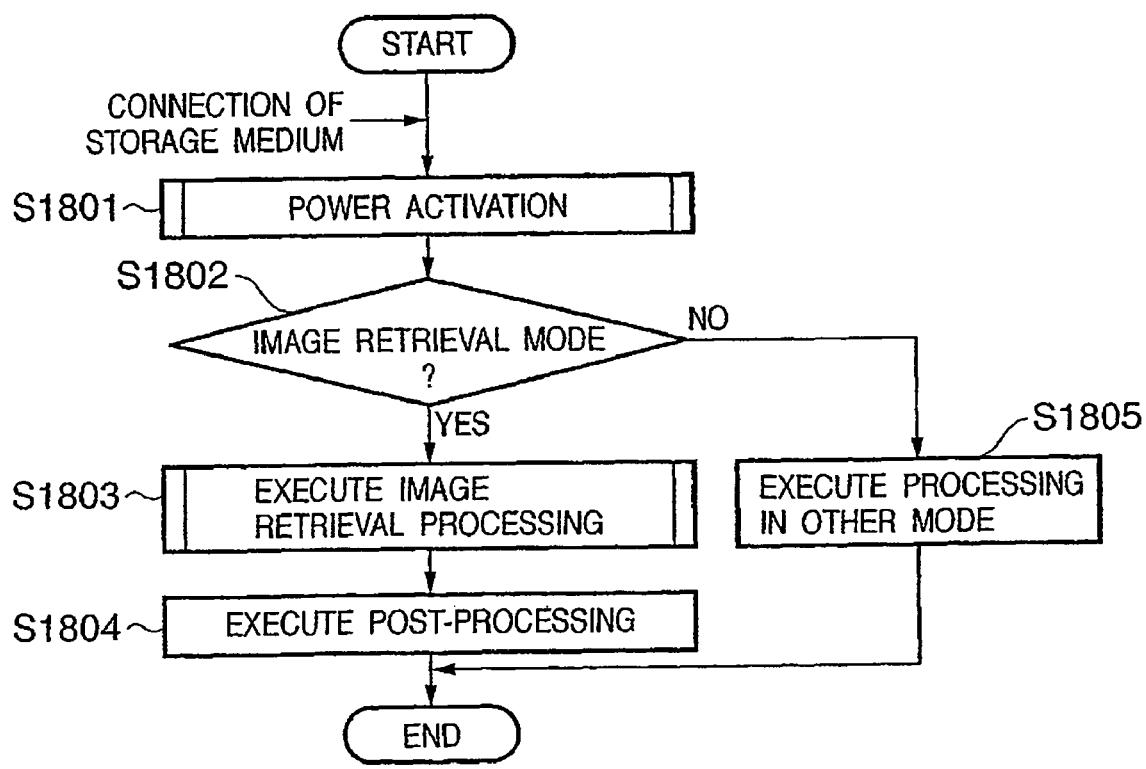

IMAGING APPARATUS

TECHNICAL FIELD

The present invention relates to technology that retrieves desired image data from among a plurality of image data.

BACKGROUND ART

In order to classify and arrange image data captured by an imaging apparatus such as a digital camera, technology has been proposed designates a folder each time an image data is captured and stores the image data in the designated folder (Japanese Patent Laid-Open No. 2003-319296).

Technology has also been proposed that retrieves image data that matches a key image from among a plurality of image data stored on a storage medium (Japanese Patent Laid-Open No. 2000-76302).

Further, technology has been proposed that sets character information corresponding to a scene that was designated at the time of imaging as a file name for an image file, and then conducts image retrieval based on the character information in question (Japanese Patent Laid-Open No. 2002-369109).

DISCLOSURE OF INVENTION

Accompanying the increases in capacity and reduction in cost of storage medium in recent years, users can now store data for several hundreds to several thousands of images on one storage medium. It is also not unusual for a user to possess a plurality of such storage medium. Users conduct image capturing while sequentially exchanging the plurality of storage medium when taking images, or play back images while sequentially exchanging the plurality of storage medium during image playback.

However, when a large amount of image data is stored on a storage medium it is difficult to find the image data of interest immediately by searching for the image data by playing back each image data individually. As a result, there is an increasing necessity for image retrieval processing.

In the methods described above, since it is necessary to perform complicated operations when designating a key image, the operations to designate a key image are troublesome. In particular, because the operability of the user interface of a digital camera is inferior to that of a personal computer, it adds to the trouble of performing operations to designate a key image.

Recently, it is no longer unusual for a user to possess a plurality of large-capacity storage medium. When searching for an image with a digital camera while exchanging a plurality of such storage medium, it is necessary to designate the key image again whenever one storage medium is changed for another storage medium, and thus the operations to designate a key image become extremely troublesome. Particularly, because the same picture must be drawn each time when creating a key image by hand, the operation has been quite troublesome. It is also difficult to perform an image retrieval operation using the same retrieve condition for a plurality of storage medium. This is because it is difficult to draw the same picture accurately each time or to take an image of the same subject each time to use the picture or image as a key image.

More specifically, since conventional digital cameras were equipped with only one memory card slot, the image data of the key image and the image data that is the object of the retrieval operation were stored inside one memory card. As a result, a key image could not be utilized commonly among a plurality of storage medium.

Thus, an object of this invention is to solve at least one of these problems and other problems. In this connection, the other problems will be understood from the overall description in this specification.

To solve the above problems, according to this invention, a first storage medium that stores image data that is the object of a retrieval operation and a second storage medium that stores a retrieve condition are connected to or incorporated into an imaging apparatus.

According to this invention, since a first storage medium that stores image data that is the object of a retrieval operation and a second storage medium that stores a retrieve condition are connected to or incorporated into an imaging apparatus, operations to designate a retrieve condition such as a key image or the like can be made easier. In addition, by exchanging the first storage medium for a third storage medium while the second storage medium is left as it is, image retrieval can be conducted for a plurality of storage medium using the same retrieve condition.

Further, according to this invention, when conducting image retrieval while sequentially exchanging a plurality of storage medium that can be removed from the imaging apparatus, even if a particular removable storage medium was removed from the imaging apparatus or was exchanged for another removable storage medium, the imaging apparatus accumulatively stores the retrieved image data on a storage medium that is incorporated into the imaging apparatus until there is an explicit delete instruction.

According to this invention, since image data that was retrieved when image retrieval was performed while sequentially exchanging a plurality of removable storage medium is accumulatively stored inside the imaging apparatus until there is an explicit delete instruction, retrieval results that were obtained when a retrieval operation was conducted for a plurality of storage medium using the same retrieve condition can be compiled to facilitate storage and management thereof.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

FIG. 18 is an illustrative flowchart relating to control processing of an imaging apparatus according to the embodiments;

BEST MODE FOR CARRYING OUT THE INVENTION

Figure 1:
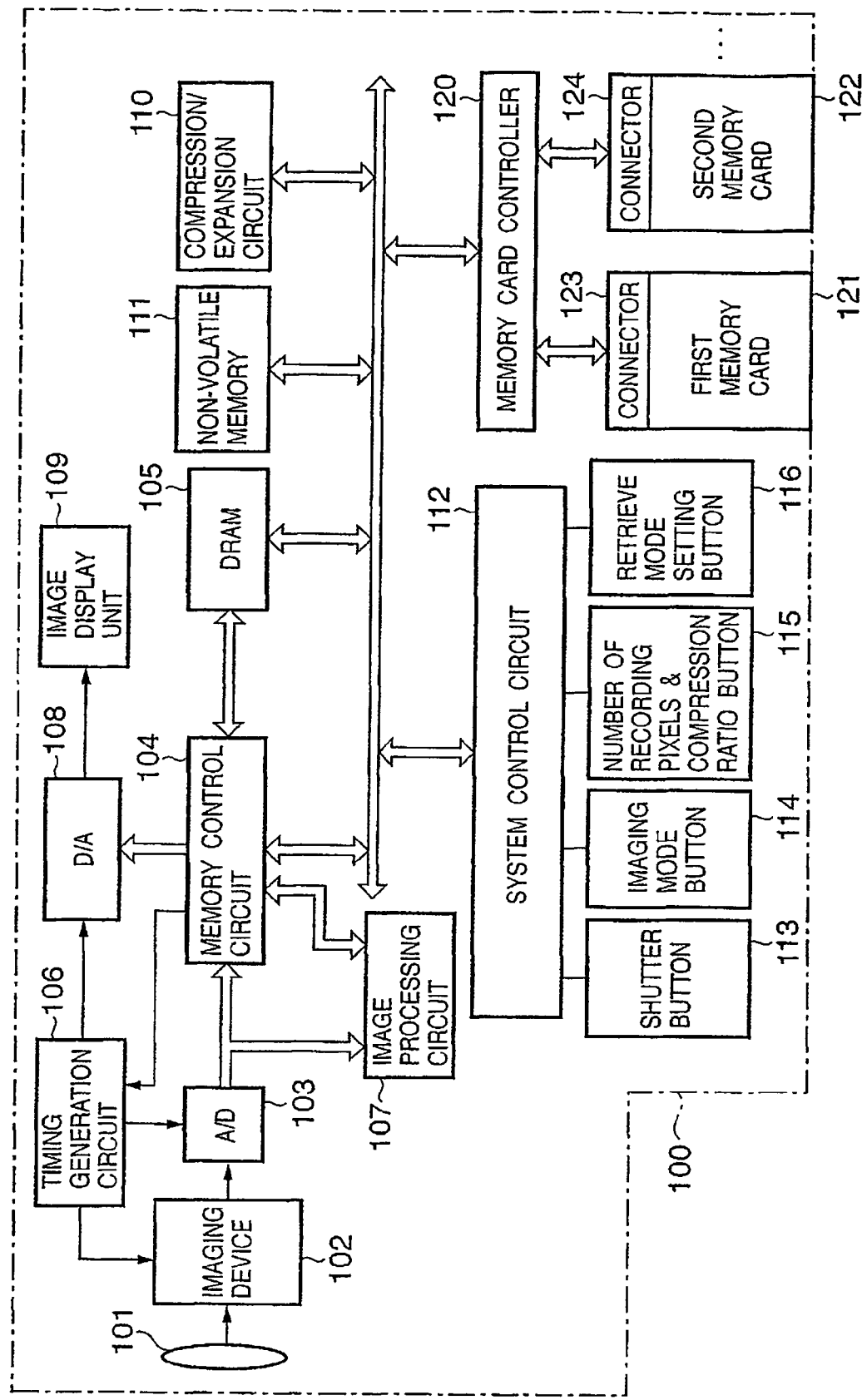
FIG. 1 is a view showing an illustrative configuration of an imaging apparatus according to the embodiments.

FIG. 1 is a view showing an illustrative configuration of the imaging apparatus of the embodiments. An imaging apparatus 100 is an information processing apparatus that connects to or is equipped with an image-capturing device such as a digital camera, a digital video camera, a PDA with a camera attached or a mobile telephone with a camera attached.

A taking lens 101 is an optical component that forms an image of a subject on an image pickup device 102. An A/D converter 103 is a circuit that converts analog signals output from the image pickup device 102 into digital signals.

A timing generation circuit 106 is a circuit that supplies a clock signal and a control signal to the image pickup device 102, the A/D converter 103 and a D/A converter 108. The timing generation circuit 106 is controlled by a memory control circuit 104 and a system control circuit 112.

An image processing circuit 107 performs predetermined pixel interpolation processing or color conversion processing for data from the A/D converter 103 or data from the memory control circuit 104.

The memory control circuit 104 controls the A/D converter 103, the timing generation circuit 106, the image processing circuit 107, a DRAM 105, the D/A converter 108, a non-volatile memory 111 and a compression/expansion circuit 110. Data output from the A/D converter 103 is written in the DRAM 105 or the non-volatile memory 111 via the image processing circuit 107 and the memory control circuit 104, or via the memory control circuit 104. The DRAM 105 may be backed up by a power supply (not shown in the figure) such as a battery. In this case, even when the main power source of the imaging apparatus 100 is deactivated, the memory contents of the DRAM 105 are retained.

An image display unit 109 is a display apparatus that includes an image display control circuit and a liquid crystal display or the like. Image data for display that was written in the DRAM 105 is displayed on the liquid crystal display that is one part of the image display unit 109 via the D/A converter 108. In this connection, it is possible to realize an electronic viewfinder function by sequentially displaying captured image data using the image display unit 109. The display of the image display unit 109 can be arbitrarily turned on or off by means of an instruction from the system control circuit 112. For example, when the display is turned off, the power consumption of the imaging apparatus 100 can be significantly reduced.

The non-volatile memory 111 is a storage medium that stores data of captured static images or data of captured dynamic images, or stores a program code that controls the imaging apparatus 100. The non-volatile memory 111 may comprise a storage capacity that is sufficient to store data of a predetermined number of static images or dynamic image data of a predetermined time period. Thus, a large amount of image data can be written into the non-volatile memory 111 at a high speed, even when conducting panoramic imaging or continuous imaging in which a plurality of static images are taken in succession.

The compression/expansion circuit 110 has a function that compresses and expands image data by discrete cosine transformation (DCT) or the like. For example, the compression/expansion circuit 110 reads image data stored in the DRAM 105 to conduct compression processing or expansion processing, and after finishing the processing writes the data in the DRAM 105.

The system control circuit 112 is a circuit that carries out unified control of the entire imaging apparatus 100. A shutter button 113 and an imaging mode setting button 114 constitute a part of the operation unit. These buttons are operated by a user when making a selection between a dynamic image or a static image, or a selection between continuous imaging mode and single image mode and the like. Reference numeral 115 denotes a button that is operated when setting the number of pixels for recording and the compression ratio. When a retrieve mode setting button 116 is pressed, a key image data edit menu is displayed on the image display unit 109. Through the key image data edit menu, a user can designate key image data, designate a store area for a retrieve result, and designate the start of a retrieval operation.

A memory card controller 120 is a control circuit that performs control of the above memory cards. A first memory card 121 and a second memory card 122 are removable memory-type storage medium that store image data files and the like. These are, for example, memory cards equipped with a non-volatile memory such as a flash memory, and the storage capacity of these memory cards is large compared to the built-in memory. The first memory card 121 is connected to a first connector 123 that functions as a connector unit. The second memory card 122 is connected to a second connector 124 that functions as a connector unit.

Although in this embodiment an example is illustrated that uses two memory cards, this invention can naturally also be applied to a case of three or more storage medium. Also, when the capacity of the non-volatile memory 111 is large enough to store a plurality of image data, the invention can be implemented as long as at least one memory card slot is provided.

Further, the respective storage medium may be of the same kind or of different kinds. More specifically, the kind of storage medium that are mounted on the apparatus, such as the built-in type storage medium and the removable-type storage medium may be different, the kind of memory and the kind of hard disk drive may be different, and the kind of connection interfaces may be different.

Figure 2:
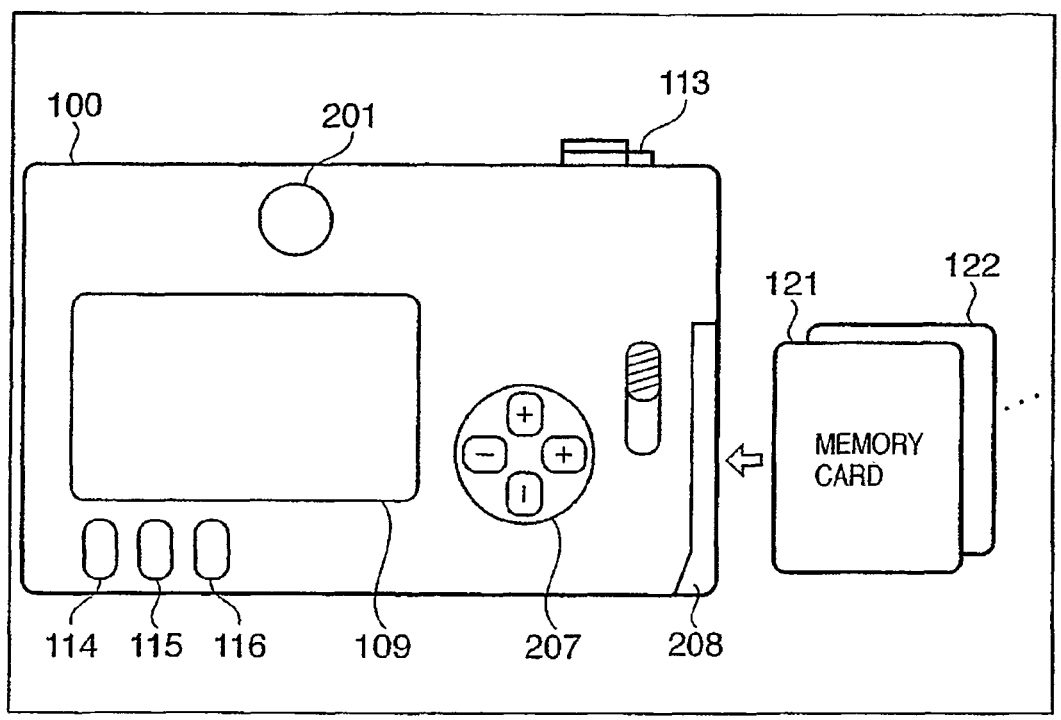
FIG. 2 is a rear view of the imaging apparatus of the present invention.

FIG. 2 is a rear view of the imaging apparatus of this invention. A description of parts in FIG. 2 that were described above for FIG. 1 is omitted hereunder. Reference numeral 201 denotes an optical viewfinder. Cross keys 207 that constitute one part of the operation unit are, for example, used when selecting a menu in the liquid crystal finder or when moving a pointer. The cross keys 207 are also used when designating various imaging parameters when taking an image. The memory cards 121 and 122 are inserted into memory card slots provided on the side of the main unit of the apparatus. The memory card slots are normally covered by a cover 208. The connector 121 or connector 122 is provided inside the memory card slots.

Figure 3:
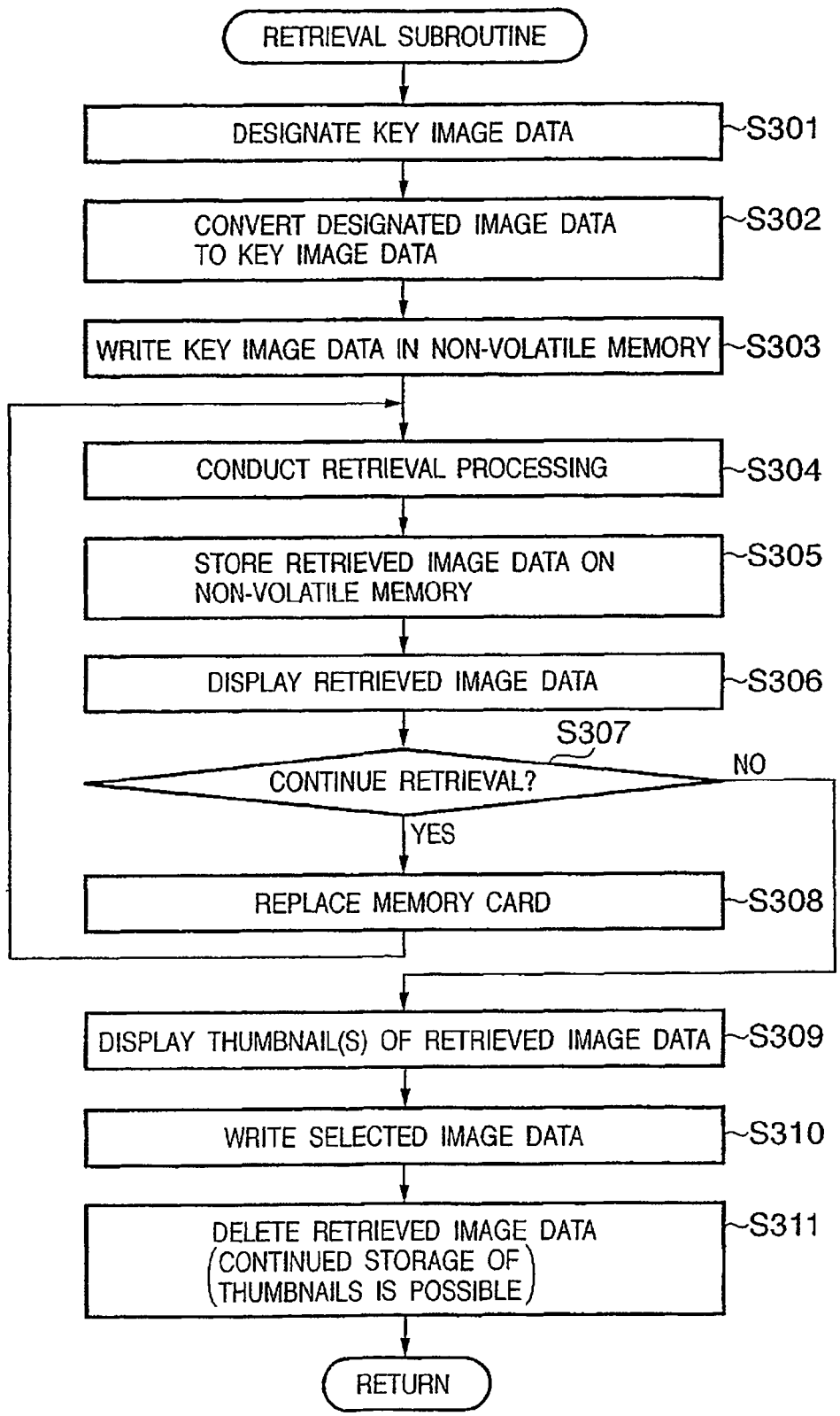
FIG. 3 is a flowchart showing an illustrative example of control processing of an imaging apparatus according to the embodiments.

FIG. 3 is a flowchart showing an illustrative example of control processing of the imaging apparatus according to this embodiment. This flowchart corresponds to a retrieval processing subroutine. When the system control circuit 112 detects, for example, operation of the retrieve mode setting button 116, it displays a retrieval menu that is in accordance with the operation contents on the display unit 109.

Figure 4:
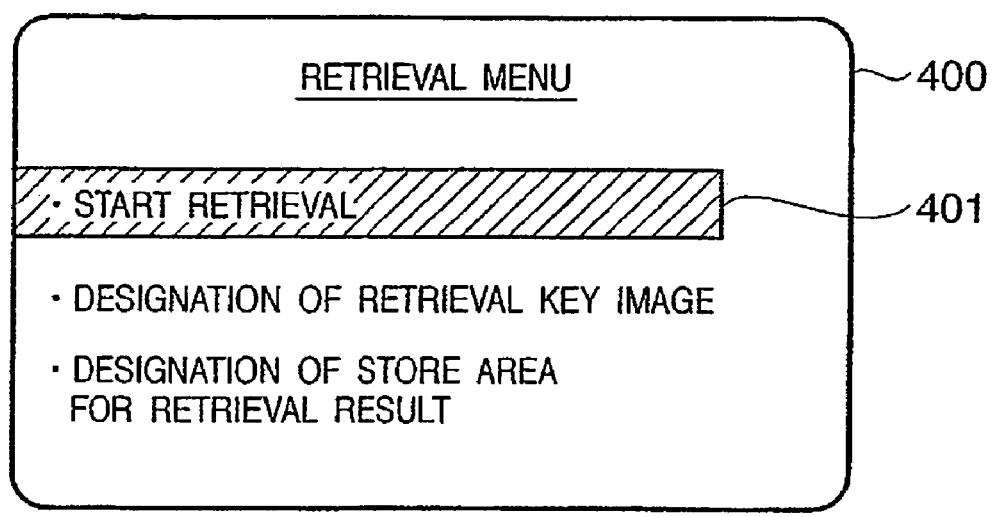
FIG. 4 is a view showing an example of a retrieval menu according to the embodiments.

FIG. 4 is a view showing an example of a retrieval menu of this embodiment. A shaded portion 401 in the retrieval menu indicates the item under selection. The shaded portion 401 can be moved, for example, according to the operations of the cross keys 207. More specifically, when the system control circuit 112 detects an operation of the cross keys 207 it recognizes the item under selection and moves the shaded portion 401. Where appropriate, movement of the shaded portion 401 can be reflected on the image display unit 109 in accordance with an instruction from the system control circuit 112. Further, when the system control circuit 112 detects operation of the retrieve mode setting button 116 or the like, it implements the item under selection.

Figure 5:
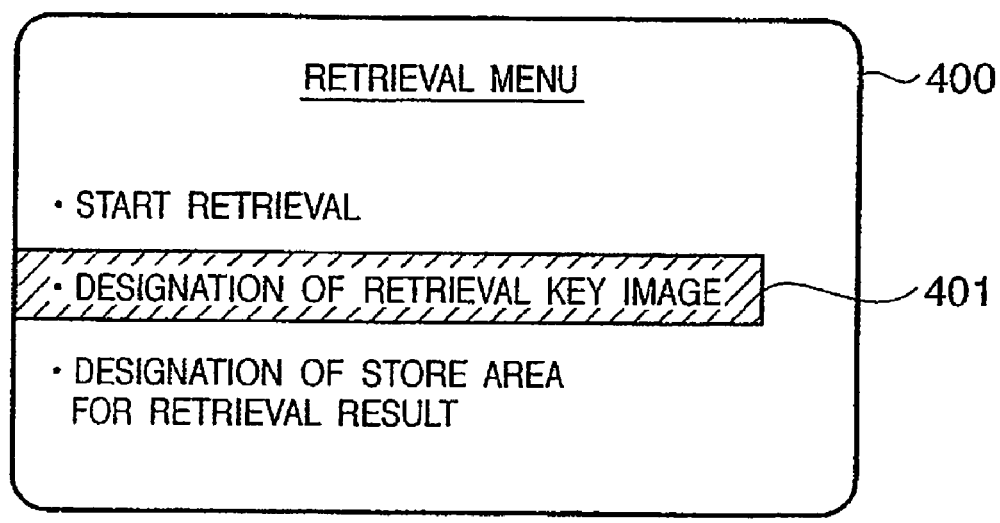
FIG. 5 is a view showing that designation of key image data was selected in the embodiments.

In step S301, when the system control circuit 112 detects that "designation of retrieval key image" included in the retrieval menu 400 was selected, it executes processing to designate the key image data. FIG. 5 is a view showing that designation of a retrieval key image was selected in this embodiment. The system control circuit 112 reads the candidate(s) (image data) in question from the storage medium that stores the candidate key image data and displays the candidate(s) on the image display unit 109. In this case, the storage medium that stores the candidate key image data is the non-volatile memory 111, the DRAM 105 or the second memory card 122. When there is a plurality of candidates as the key image data, the system control circuit 112 creates a thumbnail image of each candidate and displays the thumbnail images.

Figure 6:
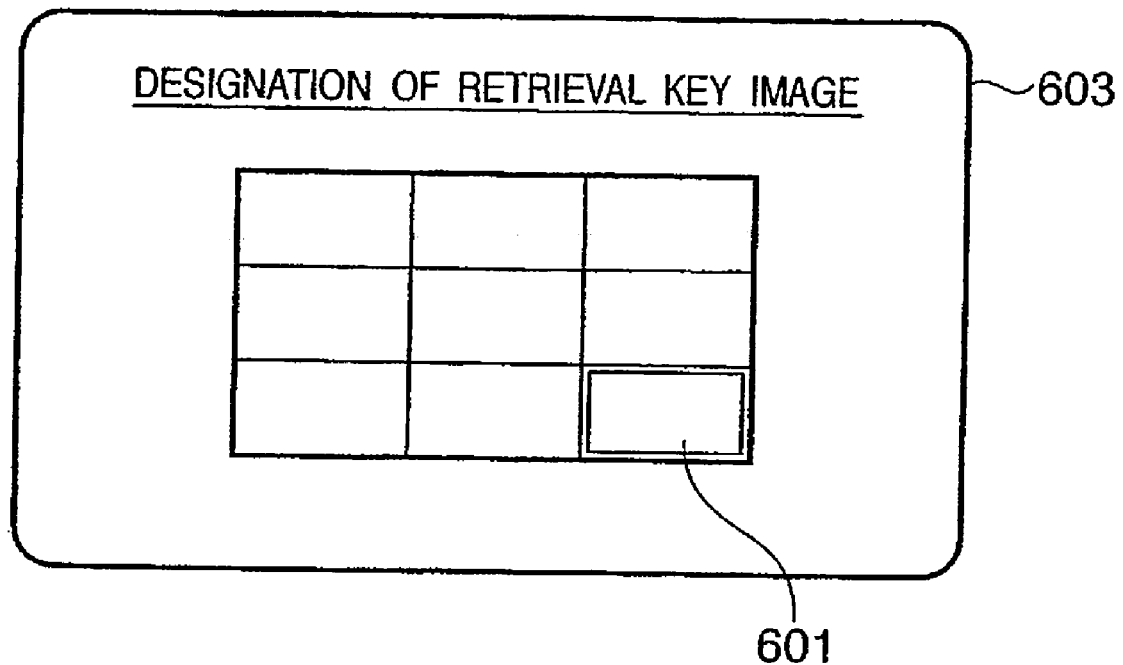
FIG. 6 is a view showing thumbnail images relating to key image candidates in the embodiments.

FIG. 6 is a view showing thumbnail images relating to candidate key images in this embodiment. In this example, the thumbnails of nine candidate images are displayed. The system control circuit 112 sets a candidate 601 that was designated by operations of the cross keys 207 as the key image data. In this connection, a plurality of key image data may also be designated.

In step S302, the system control circuit 112 converts the designated image data into key image data. For example, in order to distinguish between the key image data and the original image-data, the system control circuit 112 creates file management information for the key image data based on the file management information of the original image data. For example, in accordance with a predetermined conversion rule, the system control circuit 112 converts the file name of the selected image data to create a file name for the key image file. Examples of the conversion rule include a method in which a suffix is added to the file name of the original image data, an extension of the file name is changed or a file attribute is changed. Alternatively, the rule may be one whereby file management information is created by storing the key image data in a specific folder.

In step S303, the system control circuit 112 writes the selected key image in the non-volatile memory 111. In the connection, the system control circuit 112 may store the key image in the second memory card 122 or, as long as it is energized by a battery even after the power supply of the main unit has been deactivated, the DRAM 105. That is, the selected key image may be stored in any of the storage medium as long as the key image can be retained even if the first memory card 121 that stores image data that is the object of image retrieval is replaced by a third memory card.

In step S304, when selection is made on the retrieval menu 400 to start retrieval and an execution instruction is input, the system control circuit 112 retrieves image data that matches the designated key image from the first memory card. As used herein, the term "matches" refers not only to the case of a 100% match between the key image data and the image data that is the retrieval object, but also to a case in which a similarity greater than a predetermined level exists between the two image data. When conducting image retrieval based on the degree of similarity between the key image data and the image data that is the retrieval object, the degree of similarity can be set appropriately for each case.

In step S305, when retrieved image data exists, the system control circuit 112 writes the retrieved image data in the non-volatile memory 111.

In step S306, the system control circuit 112 reads out the retrieved image data and displays it on the display unit 109. The image that is currently displayed on the display unit 109 is continuously displayed until the next image data is retrieved. The system control circuit 112 may also create thumbnails for a plurality of retrieved image data and arrange the thumbnails on the display unit 109. The system control circuit 112 may also switch between the former display mode and the latter display mode in accordance with an operation of the cross keys 207 or the like.

In step S307, when the system control circuit 112 detects that retrieval has been completed, it selects whether to end the retrieval operation or to exchange the current memory card for another memory card and continue the retrieval operation. For example, the system control circuit 112 displays a message to inquire whether or not to exchange the current memory card for another memory card and continue the retrieval operation (or end the retrieval operation) on the display unit 109, and determines which of these was selected based on an operation signal from the cross keys 207. When a selection was made to end the retrieval operation the processing proceeds to step S309, and when a selection was made to continue the retrieval operation the processing proceeds to step S308.

Thus, it is possible to perform a continuous operation to retrieve image data that matches the key image data that is the retrieve condition while exchanging a plurality of memory cards. When a selection is made from the operation unit to end the retrieval operation after the image retrieval operation has been completed for all of the memory cards, the system control circuit 112 ends the retrieval processing.

In step S308, when the first memory card 121 (or the second memory card 122) is replaced with the third memory card, the system control circuit 112 recognizes the third memory card. When the third memory card is recognized, the operation shifts to step S304 to retrieve image data using the key image data that was used for the first memory card 121 again.

Executing an image retrieval operation in this manner for a plurality of memory cards is convenient for the user, since the key image does not have to be set again after it has been set initially. A configuration may also be adopted whereby, when a memory card has been correctly recognized after exchanging memory cards, the system control circuit 112 automatically resumes the image retrieval operation. Alternatively, the system control circuit 112 may resume the image retrieval operation after waiting for an instruction from a part of the operation unit, such as the cross keys 207.

In step S309, the system control circuit 112 displays the retrieved image data on the display unit 109.

In step S310, when the user operates the cross keys 207 to select image data that the user wants to store from among the displayed thumbnails, the system control circuit 112 writes the selected image data to the first memory card 121 or the second memory card 122. The card to store the selected image data on is selected previously by means of the operation unit.

In step S311, the system control circuit 112 deletes the retrieved image data from the non-volatile memory 111. In this connection, when the system control circuit 112 deletes the retrieved image data, it may continue to store the thumbnails of the image data in the non-volatile memory 111. Thereafter, the operation returns to the main subroutine.

According to the embodiment described above, since the imaging apparatus 100 connects to a first storage medium (for example, a first memory card 121 or a second memory card 122) that stores image data that is the object of a retrieval operation, and comprises a second storage medium (for example, non-volatile memory 111) that is of a different kind to the first storage medium, and is configured to store a retrieve condition in this second storage medium, even when the first storage medium is exchanged for a third storage medium, a retrieve condition such as key image data continues to be retained inside the imaging apparatus 100. Accordingly, when executing an image retrieval operation for the third storage medium, the burden of operations to designate the retrieve condition is lessened.

Further, the first memory card 121 or the second memory card 122 may naturally also be employed as the second storage medium. In this connection, the second storage medium need not necessarily be the non-volatile memory 111. For example, any storage medium can be used as long as it can retain the storage contents even after the power of the imaging apparatus 100 has been deactivated, such as a volatile storage medium that is energized by a backup battery. Thus, the kind of the first storage medium and that of the second storage medium may be different.

Furthermore, when managing key image data and original image data, as in this embodiment, by making the respective file management information such as file names, folder names, file extension names or file attributes different, it is easier to distinguish between the key image data and the original image data. Also, if the file management information of the key image data is derived from the file management information of the original image data, it is easier for a user to understand that the two are closely connected.

The system control circuit 112 may also comprise a copy function which reads image data stored in the first storage medium and writes at least one part of the image data that was read into the second storage medium as key image data (for example, in steps S301 to S303). More specifically, since key image data can be selected from previously prepared image data, the burden on the user can be lessened in comparison to the case of handwritten input.

Figure 7:
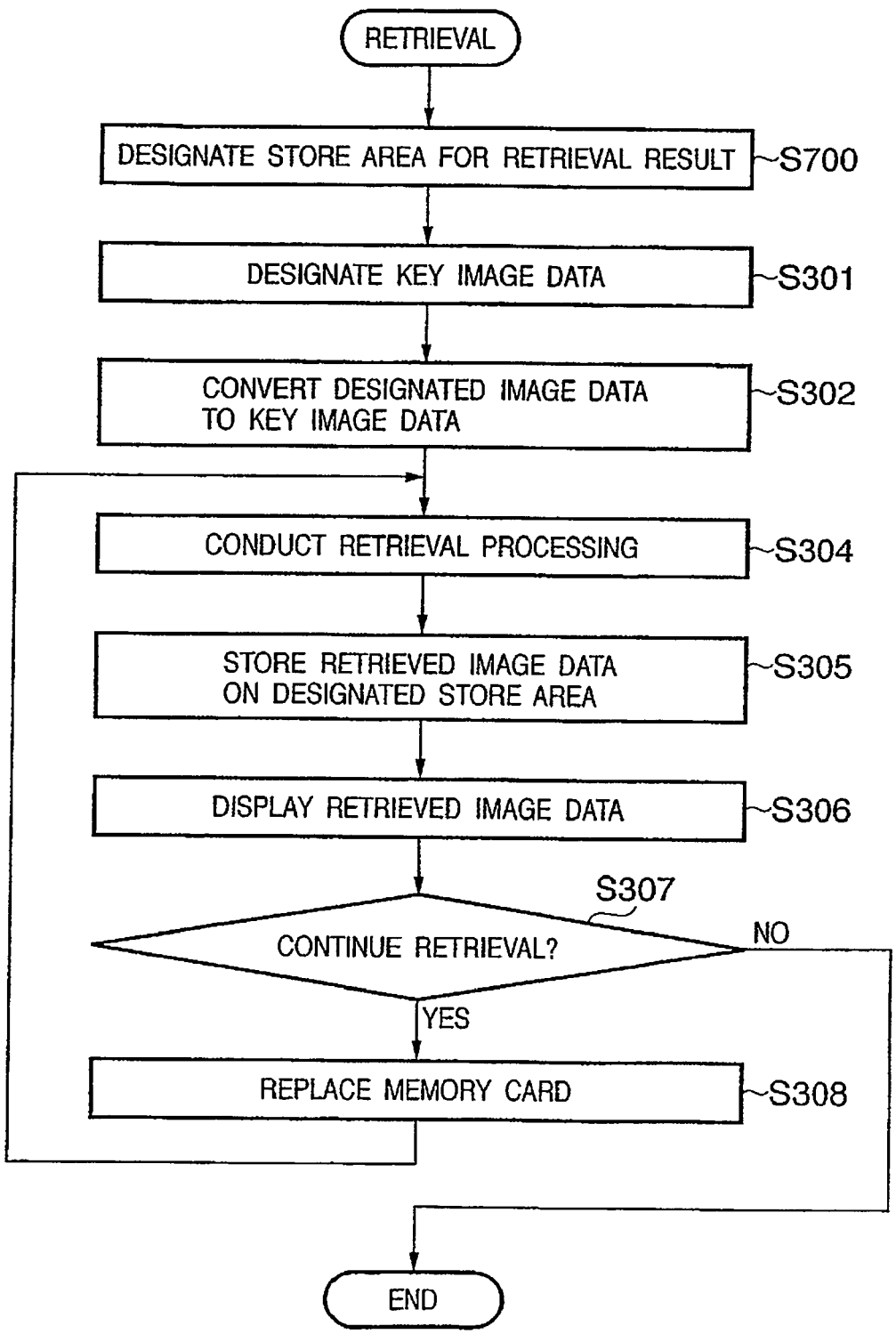
FIG. 7 is a flowchart showing another illustrative example of the control method according to the embodiments.

FIG. 7 is a flowchart showing another illustrative example of a control method of the embodiments. Processing that has already been described above is denoted by the same reference number, and a description thereof is omitted hereunder.

In this control processing, the imaging apparatus 100 is particularly effective in a case in which the non-volatile memory 111 that is capable of retaining key image data is not incorporated into the imaging apparatus 100 or the storage capacity of the non-volatile memory 111 is insufficient. For example, if a plurality of memory cards can be connected simultaneously inside the imaging apparatus 100 (that is, if there are a plurality of memory card slots), the key image data can be stored on the second memory card 122 instead of the non-volatile memory 111.

Figure 8:
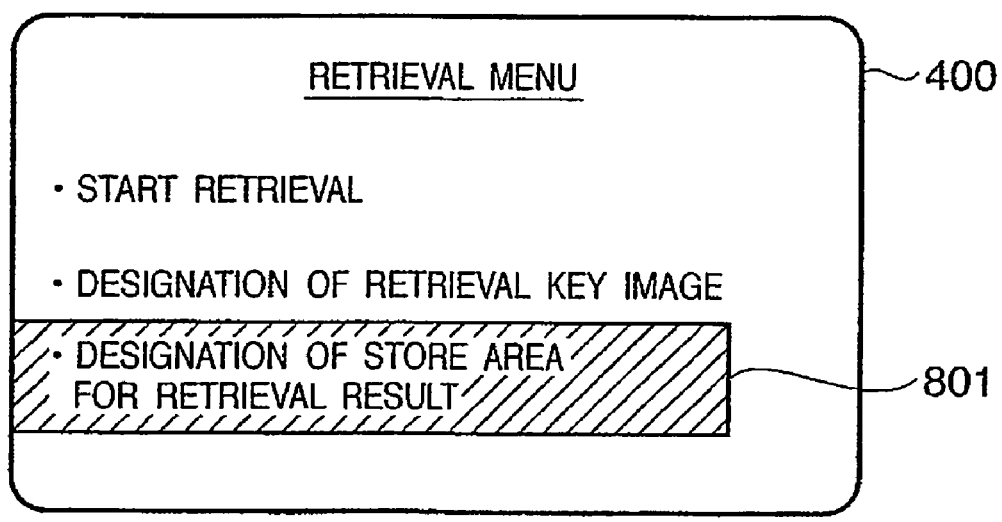
FIG. 8 is a view showing an example of a retrieval menu according to the embodiments.

FIG. 8 is a view showing an example of a retrieval menu of this embodiment. This flowchart is executed when "designation of store area for retrieval result" is selected on the retrieval menu 400.

In step S700, when the system control circuit 112 detects that designation of store area for retrieval result 801 was selected on the retrieval menu 400, it specifies the store area for the retrieved image data.

Figure 9:
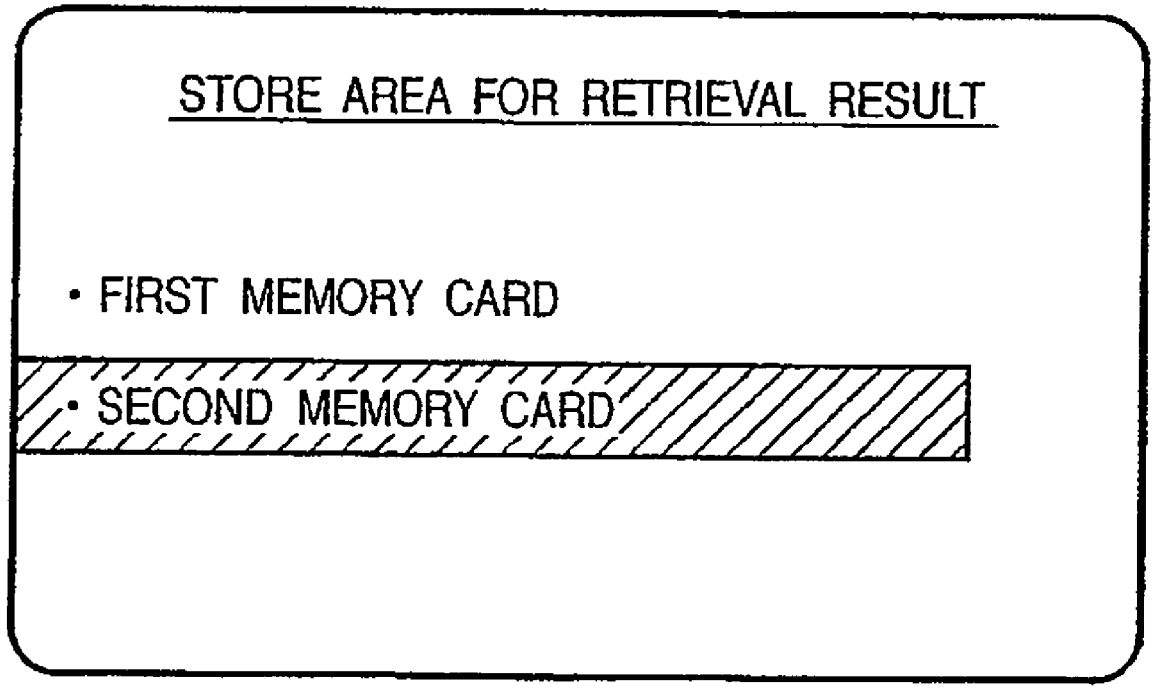
FIG. 9 is a view showing an example of the configuration of a screen for selecting a storage medium as a store area.

FIG. 9 is a view showing a configuration example of a screen for selecting a storage medium as the store area. The system control circuit 112 recognizes the memory cards that are currently connected to the imaging apparatus 100 by means of the memory card controller 120, creates a screen (FIG. 9) that lists the recognized memory cards, and displays the screen on the display unit 109. In this example, the first memory card 121 or the second memory card 122 can be designated as the store area for the retrieval result. In this connection, when the system control circuit 112 judges that there is enough free space on the non-volatile memory 111 to store the plurality of image data that was retrieved, the non-volatile memory 111 may also be displayed on the display unit 109 as a candidate store area.

Further, when the second memory card 122, for example, is selected as the store area for the retrieval result, the system control circuit 122 may also store the key image data on the second memory card 122. In this connection, the apparatus may be configured to enable selection of a store area for the key image data as well as the retrieval result or instead of the retrieval result.

Thereafter, the steps from the aforementioned step S301 to step S308 are executed, and the storage medium that was selected in step S700 is employed as the store area for the retrieved image data.

As described in the foregoing, according to this embodiment, when two or more memory cards can be connected simultaneously to the imaging apparatus, key image data is stored on a memory card connected to one of the memory card slots. Then, by connecting a plurality of memory cards to the other memory card slot by exchanging the memory cards in succession, an image retrieval operation can be carried out for the plurality of memory cards using a common key image data. Further, since retrieved image data is stored on a memory card, results obtained by conducting image retrieval operations for a plurality of memory cards can be managed uniformly.

In the embodiment described above, the system control circuit 112 may comprise an edit function that reads the key image data from a second storage medium (for example, the second memory card 122 or the non-volatile memory 111), edits the key image data that was read, and then writes the edited key image data on the second storage medium.

The system control circuit 112 may also comprise a function that deletes key image data that is stored on the second storage medium. In particular, when a plurality of key image data exists, by appropriately deleting key image data that is no longer required the storage capacity of the second storage medium can be used productively. Further, the display unit 109 that can be mounted on the imaging apparatus is relatively small compared to a personal computer or the like. As a result, there is a limit to the number of key image data that can be displayed on the display unit 109. Thus, appropriately deleting some of the key image data facilitates the visual selection of key image data.

Various embodiments of this invention have been described in the foregoing, and the invention may be applied to a system composed of a plurality of devices or to an apparatus comprising a single device.

Figure 10:
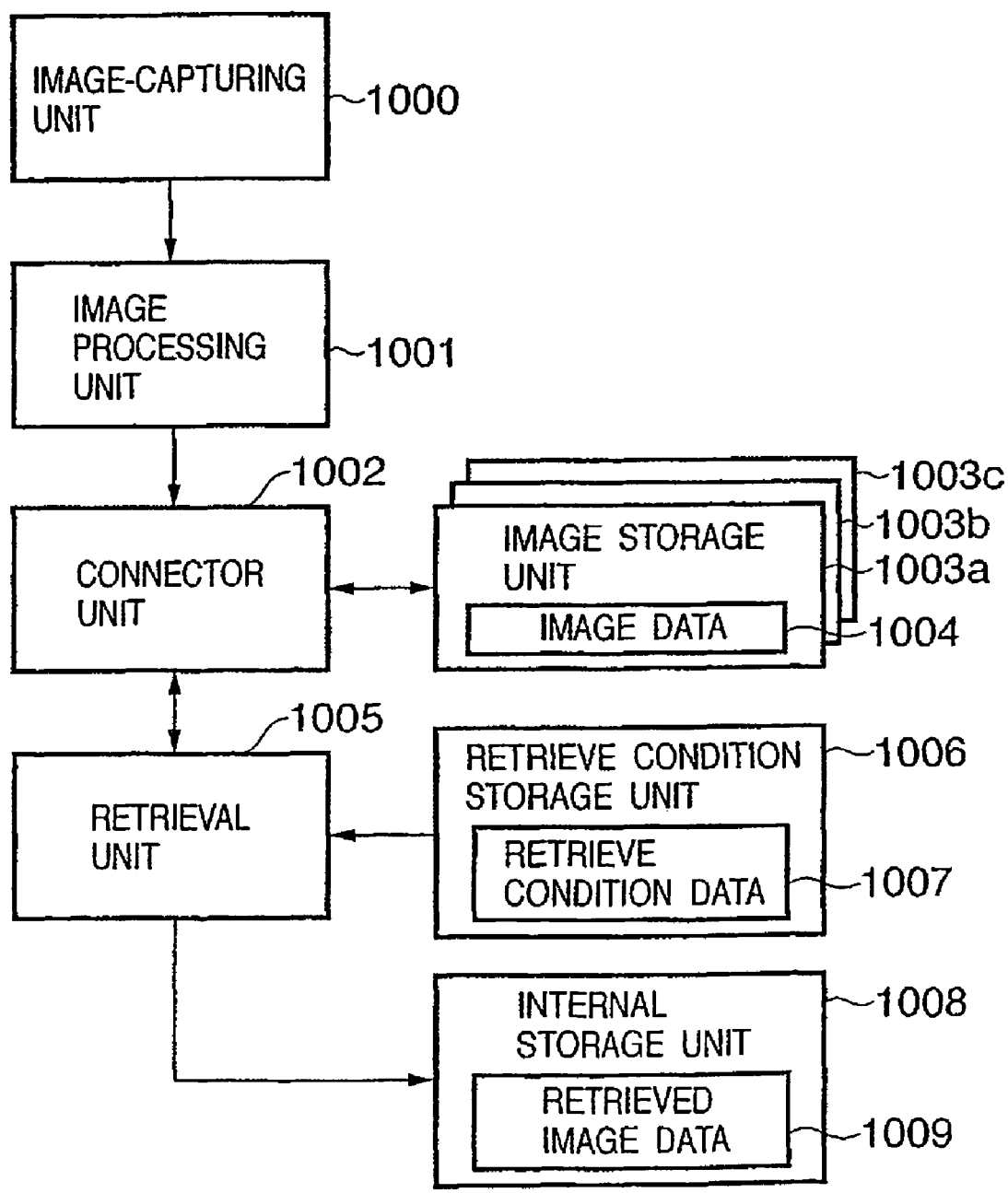
FIG. 10 is an illustrative block diagram of an imaging apparatus according to the embodiments.

FIG. 10 is an illustrative block diagram of an imaging apparatus of this embodiment. Examples of the imaging apparatus include a digital camera, a digital video camera and a personal computer to which a camera is connected (including a PDA with a camera attached, and a mobile telephone with a camera attached). In this connection, although each part may be implemented by a hardware circuit only, as described in the following the parts may also be implemented by a hardware circuit and software.

An image-capturing unit 1000 takes an image of a subject, converts the image to an electronic signal and then outputs the signal. Based on the electronic signal, an image processing unit 1001 creates image data in RAW format or image data in compressed format (e.g. JPEG or the like). A connector unit 1002 connects in a removable condition to one of a plurality of image storage units 1003*a* to 1003*c* that store image data. Hereunder, a description is given assuming that the image storage unit 1003*a* is first connected to the connector unit 1002. The image storage units 1003*a* to 1003*c* store image data 1004. The image data 1004 may be image data that was output from the image processing unit 1001 or may be image data that was written by another information processing apparatus.

A retrieve condition storage unit 1006 stores retrieve condition data 1007 such as a keyword (e.g. a file name) or a key image as a retrieve condition when conducting an image retrieval operation. A retrieval unit 1005 retrieves image data that matches the retrieve condition data from the image storage unit 1003*a* that is connected to the connector unit 1002. In this designation, the term "matches" refers not only to the case of a 100% match but also to the case of a similarity within a predetermined range.

Since specific examples of image retrieval are well known, only a brief description of image retrieval is given here. Examples of image retrieval processing include methods that use a key image and methods that use a keyword. The former retrieve image data that matches with a previously input key image. The latter embed arbitrary character strings in image data files and then retrieve image data files that include a character string that matches a keyword. The character string in question may be embedded in the file name or may be embedded within the file. That is, by employing a file format (for example, Exif format) that embeds an arbitrary character string in a file, a keyword search can be conducted with respect to character strings included in files. The arbitrary character string in question may also be a separate file.

An internal storage unit 1008 accumulatively stores retrieved image data 1009 until there is an explicit delete instruction, even if the image storage unit 1003*a* is detached from the connector unit 1002 or is exchanged for the different image storage unit 1003*b* or the like. In this connection, the term "explicit delete instruction" refers to a delete instruction signal from the operation unit accompanying an operation by a user or a delete instruction signal output by a program when a predetermined deletion condition was satisfied and the like.

According to this embodiment, since the imaging apparatus is configured to accumulatively store retrieved image data inside the imaging apparatus until there is an explicit delete instruction when an image retrieval operation is executed while sequentially exchanging a plurality of removable storage medium, even if the user exchanges or removes the storage medium, all of the desired images can be accumulated inside the imaging apparatus for management and display.

A non-volatile storage medium such as an EEPROM may be employed as the retrieve condition storage unit 1006, and the retrieval unit 1005 may commonly use the retrieve condition data 1007 stored on the non-volatile storage medium in question with respect to the plurality of image storage units 1003*a* to 1003*c* that are exchanged sequentially.

By adopting this configuration, when retrieving images while attaching and detaching a plurality of storage medium, the time and trouble taken for the user to input the retrieve condition data 1007 each time one storage medium is exchanged for another storage medium can be eliminated.

Figure 11:
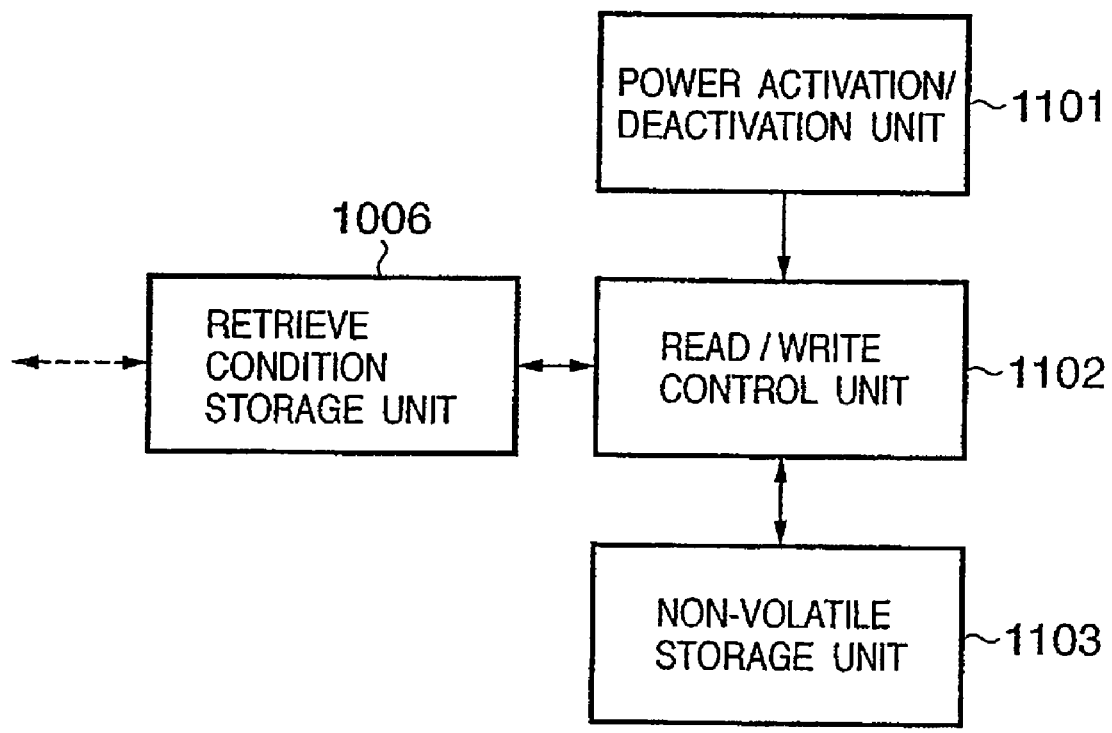
FIG. 11 is another illustrative block diagram of an imaging apparatus according to the embodiments.

FIG. 11 is another illustrative block diagram of an imaging apparatus of this embodiment. Here, a description and schematic illustration is omitted for parts that have already been described above. In this example, when the retrieve condition storage unit 1006 is a volatile storage medium such as a RAM, when the power supply is turned off the retrieve condition data 1007 is saved on a non-volatile storage medium.

A power activation/deactivation unit 1101 comprises a power switch for designating that the power of the imaging apparatus be activated or deactivated. When an operation to activate the power is executed using this switch, the power activation/deactivation unit 1101 outputs an instruction to save the retrieve condition data 1007 to a read/write control unit 1102. When the read/write control unit 1102 receives a signal relating to the save instruction, it reads the retrieve condition data 1007 from the retrieve condition storage unit 1006 and writes the retrieve condition data 1007 on a non-volatile storage unit 1103. Thus, the retrieve condition data 1007 can be saved. After the data has been saved, the power activation/deactivation unit 1101 outputs a signal instructing a power supply circuit (not shown in the figure) to deactivate the power.

In contrast, when an operation to activate the power is performed using the switch, the power activation/deactivation unit 1101 outputs a signal to instruct the power supply circuit to activate the power. When processing to activate the power is executed in the power supply circuit, the power activation/deactivation unit 1101 outputs a signal to instruct the read/write control unit 1102 to load the retrieve condition data 1007. The read/write control unit 1102 reads the retrieve condition data 1007 from the non-volatile storage unit 1103 and writes the data in the retrieve condition storage unit 1006.

According to this embodiment, when the retrieve condition storage unit is a volatile storage medium the retrieve condition data is saved on a non-volatile storage medium before the power is inactivated. Thus, for example, even if the power of the imaging apparatus main unit is deactivated during image retrieval processing, it is possible to prevent the image retrieve condition from being lost.

Further, after the power is activated the retrieve condition data is written back into the retrieve condition storage unit from the non-volatile storage unit. Thus, it is possible to lessen the trouble for the user of having to input the retrieve condition data each time the user activates and deactivates the power of the imaging apparatus main unit.

Figure 12:
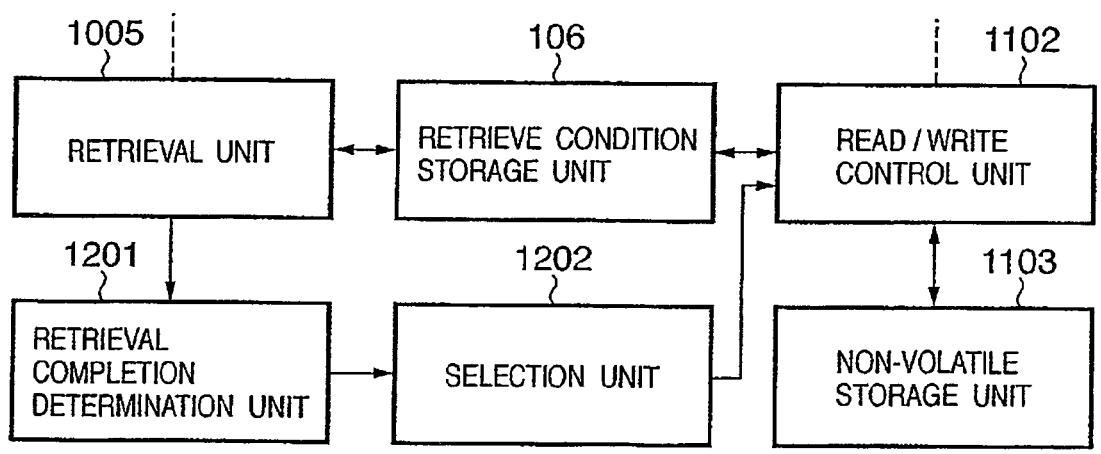
FIG. 12 is a further illustrative block diagram of an imaging apparatus according to the embodiments.

FIG. 12 is a further illustrative block diagram of an imaging apparatus of this embodiment. The blocks in this figure can be combined with any of the imaging apparatuses that were described in relation to FIG. 10 or FIG. 11. In this example, the configuration enables the user to select whether to store or delete the retrieve condition data after the completion of a retrieval operation.

A retrieval completion determination unit 1201 determines whether or not image retrieval processing executed by the retrieval unit 1005 was completed.

When the retrieval completion determination unit 1201 determines that the image retrieval processing was completed, it notifies a selection unit 1202 that the processing was completed. The selection unit 1202 selects whether or not to store the retrieve condition data 1007 on the non-volatile storage unit 1103. The selection unit 1202, for example, displays a message on the display unit to ask the user whether to store or delete the retrieve condition data 1007. The selection unit 1202 then determines which of these options was selected on the basis of an operation signal from the operation unit. When the user selects to store the retrieve condition data 1007 in the non-volatile storage unit 1103, the selection unit 1202 outputs a signal to instruct the read/write control unit 1102 to save the retrieve condition data 1007. Thereafter, save processing and load processing are executed as described above.

Since the user can select whether to save or delete the retrieve condition data, it is possible for the user to delete retrieve condition data that is no longer wanted. Thus, wasteful use of the non-volatile storage medium can be reduced. The effect of this feature is particularly significant when the retrieve condition data is data of a large size, such as a key image.

Figure 13:
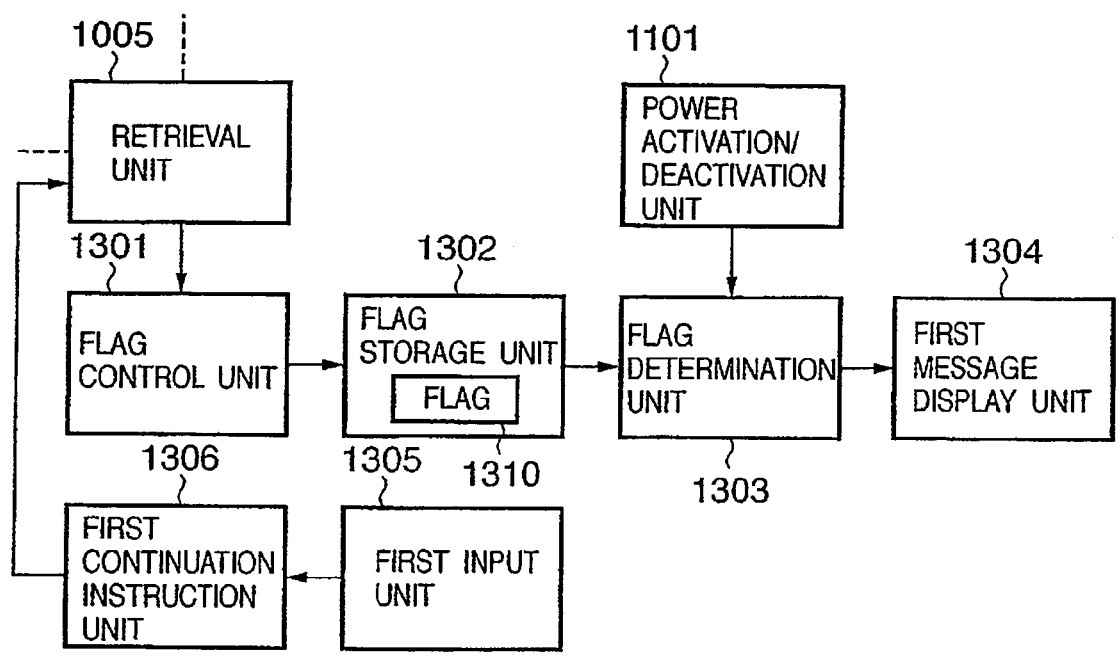
FIG. 13 is another illustrative block diagram of an imaging apparatus according to the embodiments.

FIG. 13 is another illustrative block diagram of an imaging apparatus of this embodiment. The blocks in this figure can be combined with any of the imaging apparatuses that were described in relation to FIG. 10 to FIG. 12. According to this example, even when the power is deactivated unexpectedly during image retrieval processing, the image retrieval processing can be resumed when the power is reactivated.

When image retrieval processing by the retrieval unit 1005 starts, a flag control unit 1301 sets a flag 1310 that indicates a retrieval operation is in progress. The flag 1310 is stored in a flag storage unit 1302. Further, when the image retrieval processing ends, the flag control unit 1301 resets the flag 1310. When the power of the imaging apparatus is activated, the power activation/deactivation unit 1101 notifies a flag determination unit 1303 that the power was activated. In this connection, without using the notification, the flag determination unit 1303 may be programmed to always execute an operation to determine the flag status at the time of power activation. Thus, the flag determination unit 1303 reads the flag 1310 from the flag storage unit 1302 to determine whether or not the flag is set. Although it is desirable that the flag storage unit 1302 be a non-volatile storage medium, a volatile storage medium may also be used as long as the storage state can be maintained by a battery of the imaging apparatus.

In a case where the flag has been set, the flag determination unit 1303 sends a notification to that effect to a first message display unit 1304. The first message display unit 1304 then displays a message to inquire whether or not to continue the image retrieval processing.

In accordance with an operation by the user, a first input unit 1305 that is a part of the operation unit inputs an instruction indicating whether or not to continue the image retrieval processing into a first continuation instruction unit 1306. When an instruction to continue image retrieval processing was input, the first continuation instruction unit 1306 instructs the retrieval unit 1005 to continue image retrieval processing. The retrieval unit 1005 reads the retrieve condition data 1007 from the retrieve condition storage unit 1006 to resume the image retrieval processing.

Thus, according to this embodiment, even when the power is deactivated unexpectedly during image retrieval processing, the image retrieval processing can be resumed when the power is reactivated. Further, since a decision as to whether or not to resume the processing can be entrusted to the user, the usability of the image retrieval processing is enhanced. In this connection, although a flag was used in the above description, as used herein the term "flag" refers to means that can retain the fact that image retrieval processing is in progress.

Figure 14:
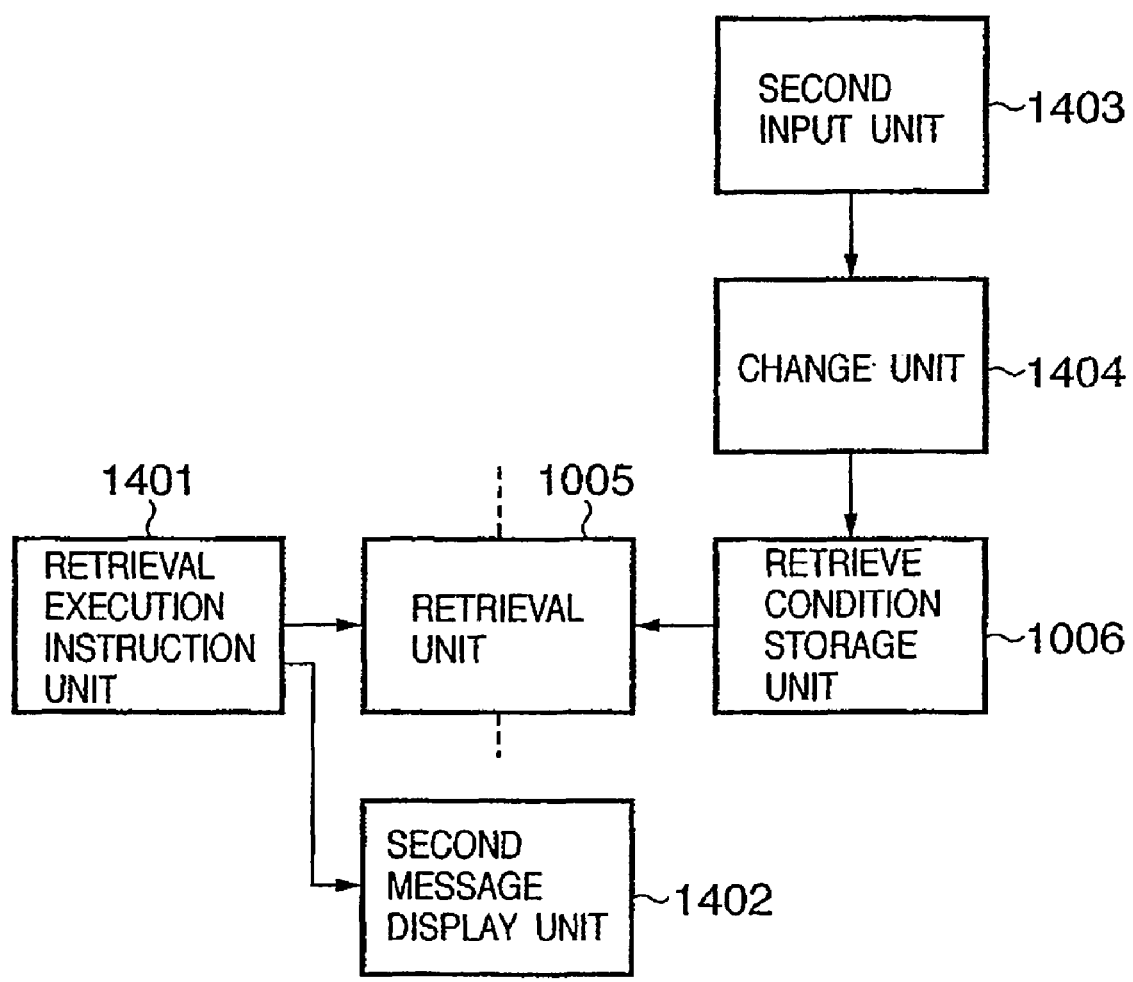
FIG. 14 is a further illustrative block diagram of an imaging apparatus according to the embodiments.

FIG. 14 is a further illustrative block diagram of an imaging apparatus of this embodiment. The blocks in this figure can be combined with any of the imaging apparatuses that were described in relation to FIG. 10 to FIG. 13. According to this example, when an instruction was made to execute an image retrieval operation, the user can select whether to use the existing retrieve condition data or to change a part or all thereof.

When an operation by the user signifies the execution of an image retrieval operation, a retrieval execution instruction unit 1401 that is a part of the operation unit displays a message to inquire whether or not to change the retrieve condition data 1007 on a second message display unit 1402. The second message display unit 1402 may also read the current retrieve condition data 1007 from the retrieve condition storage unit 1006 and display the data.

In accordance with an operation by the user, a second input unit 1403 that is a part of the operation unit inputs an instruction to change the retrieve condition data 1007 to a change unit 1404. When an instruction to change the retrieve condition data is input, the change unit 1404 writes new retrieve condition data that is input from a part of the operation unit such as the second input unit 1403 into the retrieve condition storage unit 1006.

When the retrieval execution instruction unit 1401 is notified by the change unit 1404 that changing of the retrieve condition data 1007 is completed, it instructs the retrieval unit 1005 to execute a retrieve operation.

Thus, according to this embodiment, since it is possible to confirm whether to use or change the existing retrieve condition data prior to executing an image retrieval operation, the possibility of a user executing image retrieval processing using the wrong retrieve condition data can be reduced.

Figure 15:
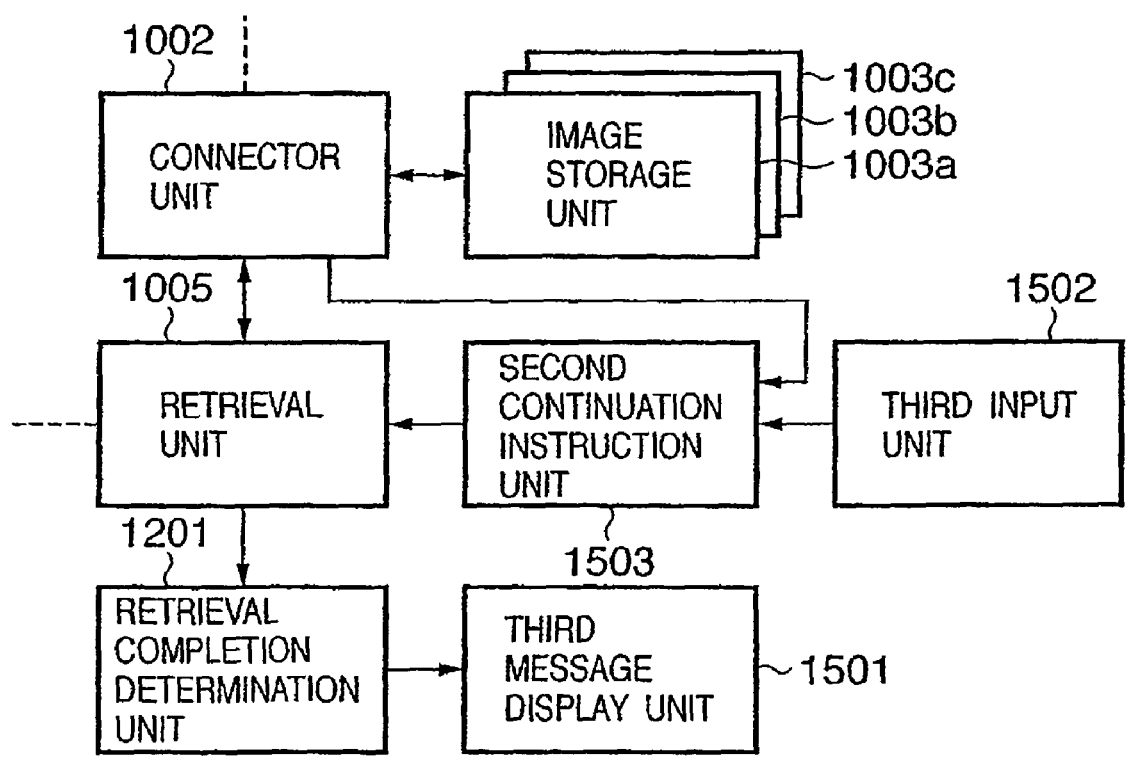
FIG. 15 is further illustrative block diagram of an imaging apparatus according to the embodiments.

FIG. 15 is another illustrative block diagram of an imaging apparatus of this embodiment. The blocks in this figure can be combined with any of the imaging apparatuses that were described in relation to FIG. 10 to FIG. 14. According to this example, when image retrieval processing was completed for a certain image storage unit, the user can select whether or not to replace the image storage unit with a different image storage unit and continue the image retrieval processing.

When the retrieval completion determination unit 1201 determines that image retrieval processing has been completed for an arbitrary image storage unit (for example, the image storage unit 1003$a$), a third message display unit 1501 displays a message to inquire whether or not to replace the image storage unit with a different image storage unit and continue the image retrieval processing.

In accordance with an operation by the user, a third input unit 1502 that is a part of the operation unit inputs an instruction indicating whether or not to continue the image retrieval processing to a second continuation instruction unit 1503.

When an instruction to continue image retrieval processing is input and a different image storage unit (for example, the image storage unit 1003*b*) is connected to the connector unit 1002, the second continuation instruction unit 1503 instructs the retrieval unit 1005 to continue the image retrieval processing.

Thus, according to this embodiment, when image retrieval processing has been completed for a specific image storage unit, the user can select whether or not to replace the image storage unit with a different image storage unit and continue the image retrieval processing. As a result, the continuity of processing is enhanced when executing an image retrieval operation for a plurality of image storage units in succession. The usability of the image retrieval operation is also enhanced.

Figure 16:
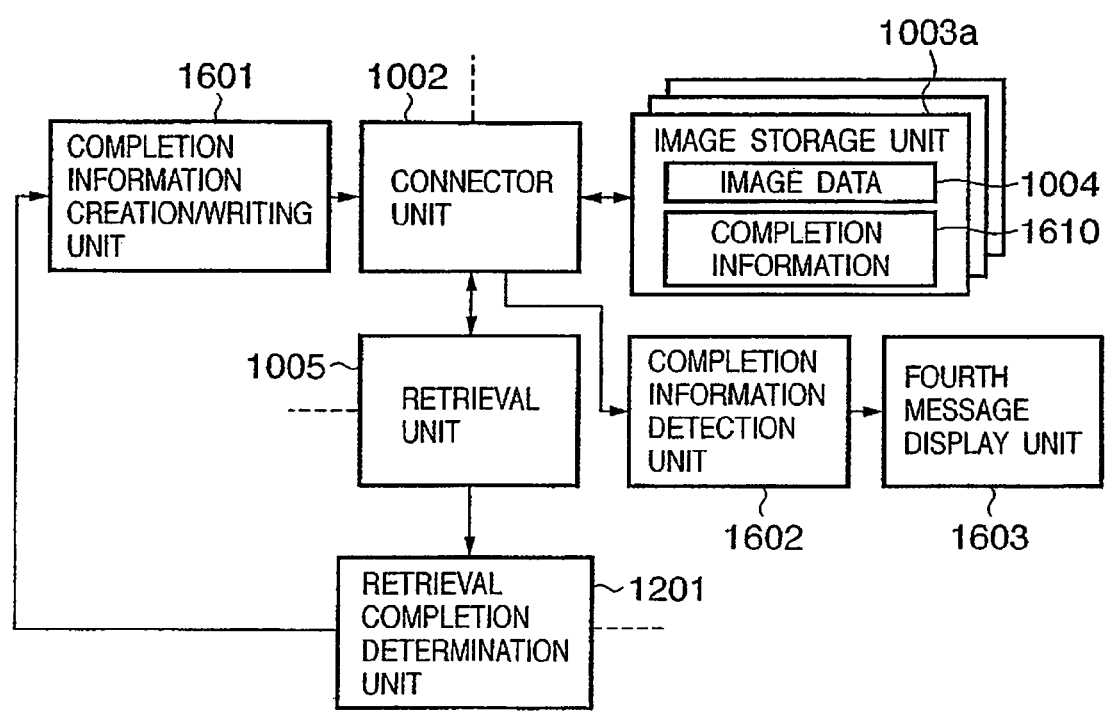
FIG. 16 is a further illustrative block diagram of an imaging apparatus according to the embodiments.

FIG. 16 is a further illustrative block diagram of an imaging apparatus of this embodiment. The blocks in this figure can be combined with any of the imaging apparatuses that were described in relation to FIG. 10 to FIG. 15. In this example, the configuration prevents a user from mistakenly conducting a retrieve operation a second time (duplicate retrieval) for an image storage medium which has already been subjected to a retrieval operation.

When the retrieval completion determination unit 1201 determines that image retrieval processing based on arbitrary retrieve condition data 1007 has been completed, a completion information creation/writing unit 1601 creates a completion information 1610 that shows that image retrieval processing using the retrieve condition data 1007 in question is completed, and writes the completion information into the image storage unit 1003*a* that is connected to the connector unit 1002. The completion information includes identification information for identifying the retrieve condition data. Thus, it is possible to prevent a duplicate retrieve operation being conducted using the same retrieve condition data.

A completion information detection unit 1602 detects that the image storage unit 1003*a* on which the completion information 1610 is stored is connected to the connector unit 1002. For example, when the image storage unit 1003*a* is connected, the completion information detection unit 1602 attempts to read the completion information 1610, and when the read attempt is successful it compares the identification information of the retrieve condition data included in the completion information 1610 and identification information of the retrieve condition data 1007 that is stored on the retrieve condition storage unit 1006. Thus, it can detect whether or not the image storage unit is one for which the retrieve operation was completed. In this connection, the identification information may be included in the retrieve condition data 1007 or may be stored as a separate file in the retrieve condition storage unit 1006.

When the image storage unit 1003*a* for which the retrieve operation was completed is detected by the detection unit 1602, a fourth message display unit 1603 displays a message indicating that image retrieval processing has been completed for the retrieve condition data 1007.

Thus, according to this embodiment, it is possible to prevent a duplicate retrieve operation being performed for an image storage medium that was already subjected to the retrieve operation.

Figure 17:
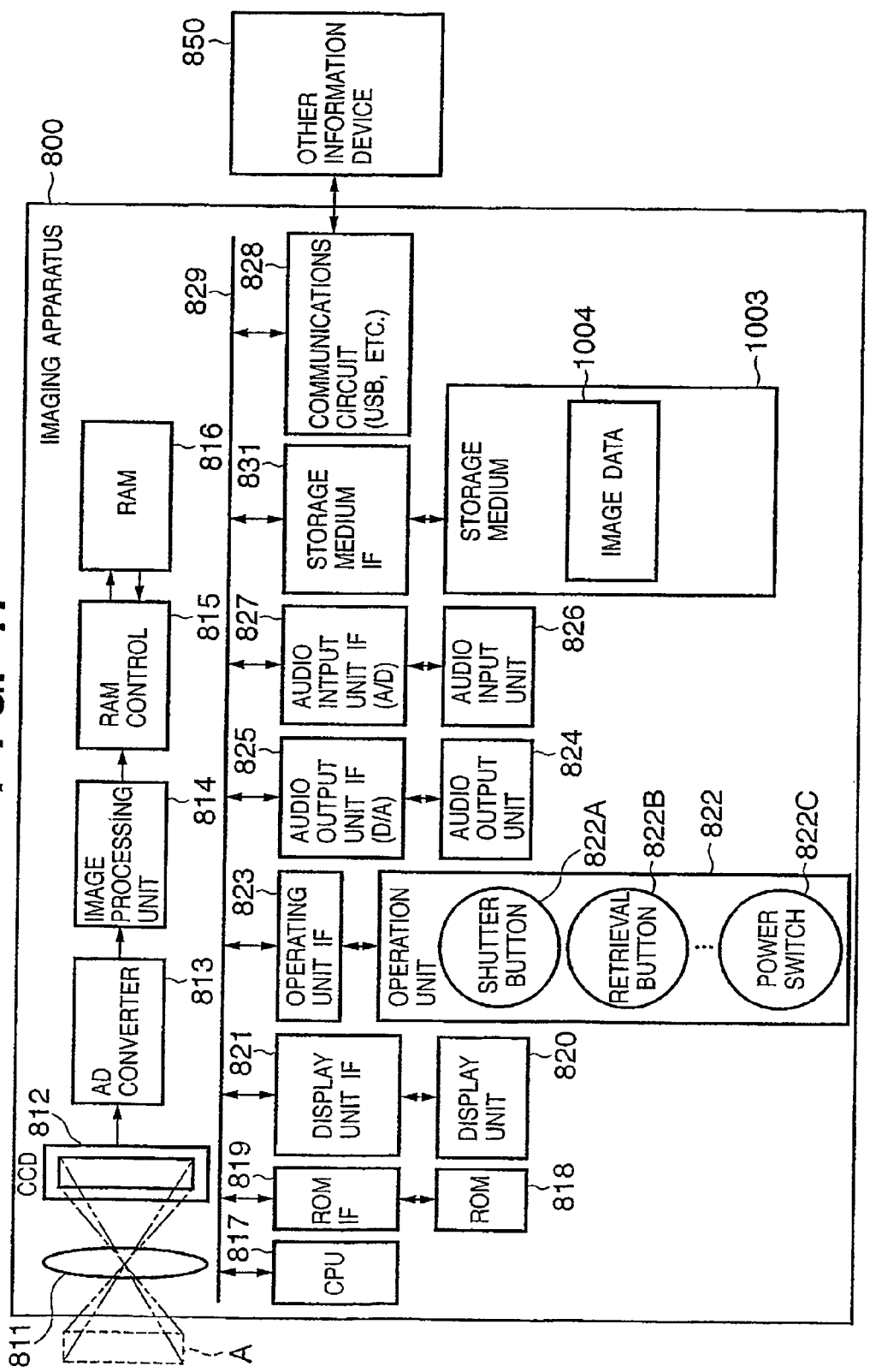
FIG. 17 is a view showing an example of the hardware configuration of an imaging apparatus according to the embodiments.

FIG. 17 is a view showing an example of the hardware configuration of an imaging apparatus of this embodiment. In FIG. 17, reference numeral 800 denotes an imaging apparatus such as a digital camera, and the apparatus records static images and dynamic images as electronic data. As a operation unit 822, the imaging apparatus 800 comprises a shutter button 822A, a retrieve button 822B, a mode setting dial (not shown in the figure), a power switch 822C, a display and file operations-related button (not shown in the figure), a ZOOM & WIDE button (not shown in the figure), a DISP button (not shown in the figure) and the like. The operation unit 822 is connected to a CPU 817 through a operation unit IF 823. The above-described first input unit 1305, second input unit 1403 and third input unit 1502 are implemented by these components.

Further, a display unit 820 is composed of a liquid crystal display or the like. The image of a subject, images that were already captured, retrieve condition data such as a key image for use when performing a retrieval operation, a retrieval result and an operations guide for a user and the like are displayed on the display unit 820. The display unit 820 is connected to the CPU 817 through a display unit IF 821. The above-described first message display unit 1304, second message display unit 1402, third message display unit 1501 and fourth message display unit 1603 are implemented by these components.

A housing unit for image recording medium is provided in the imaging apparatus 800. An image recording medium is mounted on this housing unit as the image storage unit 1003. The recording medium 1003 is a memory card that is capable of repeated read/write operations such as an ordinary Compact Flash Card (registered trade mark) or is a hard disk drive or the like.

In FIG. 17, reference character A denotes the image of a subject. Reference numeral 811 denotes an optical system such as a lens, reference numeral 812 denotes a CCD (or CMOS sensor or the like) as an image pickup device, and reference numeral 813 denotes an A/D converter. The above-described image-capturing unit 1000 is implemented by these components. Reference numeral 814 denotes an image processing unit for conducting signal processing, such as shading compensation and gamma conversion, for an RGB signal suited for human vision, with respect to a digital image input signal that was input via the A/D converter 813. The image processing unit 1001 described above is implemented by the image processing unit 814.

Reference numeral 815 denotes a RAM controller which connects to a main CPU bus 829 and is also connected to a RAM 816 as storage component. The RAM 816 functions as the above-described retrieve condition storage unit 1006 or the internal storage unit 108.

Reference numeral 817 denotes a (main) CPU that performs unified control of the imaging apparatus 800. Reference numeral 818 denotes a ROM that stores programs in which methods for control of the overall imaging apparatus are described. The ROM 818 includes an EEPROM and a mask ROM. The EEPROM functions as the above-described retrieve condition storage unit 1006 or internal storage unit 1008. Reference numeral 819 denotes a ROM IF that fulfills the role of an interface between the ROM 818 and the main CPU bus 829. Reference numeral 824 denotes an audio output unit such as a speaker or a buzzer. Reference numeral 825 denotes an audio output unit IF that includes a DA converter or the like. Reference numeral 826 denotes an audio input unit such as a microphone. Reference numeral 827 denotes an audio input unit IF that includes an A/D converter or the like.

Reference numeral 828 denotes a communications circuit as communication component for fulfilling a function of communicating with other information devices and the like. Examples of the communications circuit 828 include circuits conforming to specific standards such as USB, IEE1394, LAN, wireless LAN and the like. The imaging apparatus 800 can communicate with another information device 850 such as a personal computer or a printer through this circuit. This circuit also enables images and the like that were taken by the imaging apparatus to be sent to a personal computer or to be printed directly by a printer or the like. It is also possible to operate the imaging apparatus 800 by remote control from the other information device 850.

The display unit 820 is connected to the main CPU bus 829 through the display unit IF 821, and it can be driven from the (main) CPU 817. Likewise, the operation unit 822 that includes the aforementioned shutter button 822A, retrieve button 822B and the like is connected to the main CPU bus 829 through the operation unit IF 823. The CPU 817 can recognize instructions input by the operator through the operation unit 822.

An image recording medium functioning as the image storage unit 1003 is connected to the main CPU bus 829 through a storage medium IF 831. The above-described connector unit 1002 is implemented by this storage medium IF 831.

FIG. 18 is an illustrative flowchart relating to control processing of an imaging apparatus of this embodiment. In this connection, the image storage medium 1003 can connect to the storage medium IF 831 functioning as the connector unit 1002 at an arbitrary timing (although this timing may be while the power is deactivated or activated, when attaching importance to safety the timing is preferably while the power is deactivated).

In step S1801, when an instruction to activate the power is sent by means of the power switch 822C, a signal is sent to a power supply circuit (not shown in the figure) instructing the circuit to activate the power, whereby the power is activated. In this connection, when an image retrieval operation was in progress at the immediately preceding time that the power was deactivated, the operation shifts to a retrieval resumption subroutine that is described later herein.

In step S1802, the CPU 817 determines which mode of the apparatus was activated, such as image retrieve mode or a different mode (for example, static image-capturing mode, dynamic image-capturing mode or image display mode). The CPU 817 may also display a message to confirm whether or not to continue image retrieval on the display unit 820.

Determination of the mode can be carried out on the basis of a selection signal from the mode setting dial (not shown in the figure) that is provided on the operation unit 822. When the activated mode is not the image retrieve mode (i.e. the mode is a different mode), the operation proceeds to step S1805 to execute the processing of the selected different mode. In contrast, when the activated mode is the image retrieve mode the operation proceeds to step S1803.

In step S1803, the CPU 817 reads the retrieve condition data 1007 from the ROM 818 or RAM 816 functioning as the retrieve condition storage unit 1006, and retrieves image data that matches the read retrieve condition data 1007 from the image storage medium 1003. In this image retrieval processing, as described later, a continuous image retrieval operation can be executed while sequentially exchanging a plurality of image storage medium 1003a to 1003c. Further, the retrieve condition data 1007 at that time may be used commonly for the plurality of image storage medium 1003a to 1003c.

In step S1804, the CPU 817 executes post-processing relating to the image retrieval processing. A detailed example of post-processing is described later, and for example, the post-processing involves the display, printing, internal storage or deletion of a retrieved image, or internal storage or deletion of retrieve condition data.

Figure 19:
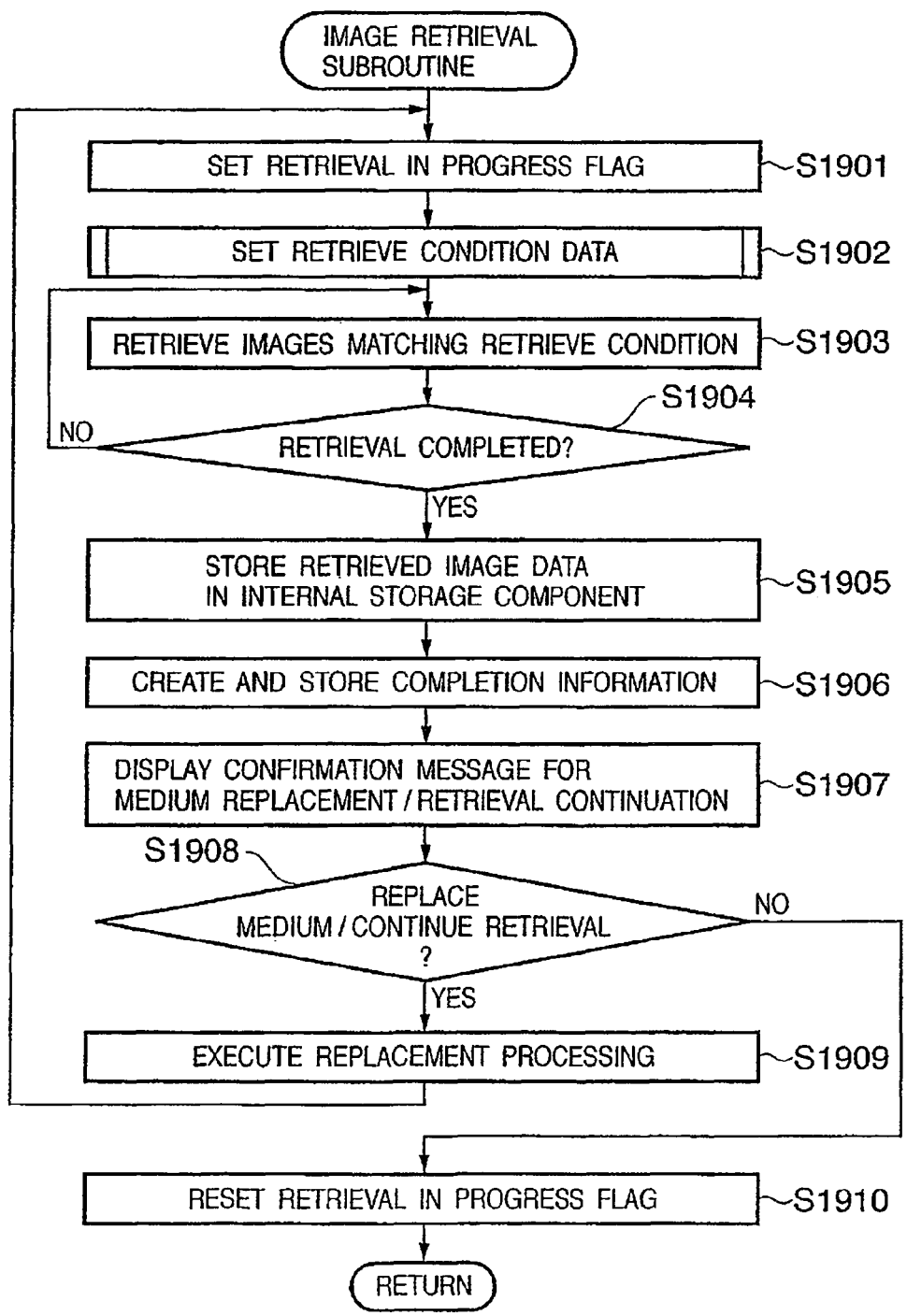
FIG. 19 is an illustrative flowchart relating to an image retrieval subroutine according to the embodiments.

FIG. 19 is an illustrative flowchart relating to an image retrieval subroutine of this embodiment. This subroutine corresponds to step S1803.

In step S1901, the CPU 817 sets a retrieval in progress flag 1310 and stores the flag 1310 in the ROM 818 or RAM 816 functioning as the flag storage unit 1302. Thus, it is possible to retain the fact that retrieval processing is in progress.

In step S1902, the CPU 817 sets retrieve condition data. Although this is described in further detail later, in brief, the CPU 817 reads the retrieve condition data 1007 from the RAM 816 or ROM 818 functioning as the retrieve condition storage unit 1006, or changes (including a case of creating new data) the retrieve condition data 1007 based on data that was input from the operation unit 822.

In step S1903, the CPU 817 retrieves the image data 1004 that matches with the retrieve condition data 1007 from the image storage medium 1003. As described above, the image retrieval can be implemented by character string comparison processing using a keyword or by image comparison processing using a key image.

In step S1904, the CPU 817 determines whether or not the image retrieval processing was completed for the Image storage medium 1003 that is currently connected. If the processing has been completed the operation proceeds to step S1905.

In step S1905, the CPU 817 stores image data 1009 that was retrieved by the retrieval operation in the RAM 816 or ROM 818 functioning as the internal storage unit 1008.

In step S1906, the CPU 817 creates completion information 1610 and writes it on the image storage medium 1003 that is currently connected. The CPU 817 creates the completion information 1610 to include identification information for identifying the retrieve condition data 1007. The identification information is created by the CPU 817 each time the retrieve condition data 1007 is changed and is stored on the ROM 818 or RAM 816 together with the retrieve condition data 1007. By using this completion information 1610, it is possible to prevent a duplicate retrieval operation being conducted for the image storage medium 1003 using the same retrieve condition data 1007.

In step S1907, the CPU 817 displays on the display unit 820 a confirmation message to inquire whether or not to replace the image storage medium and continue the image retrieval processing. The CPU 817 then waits for an input from the operation unit 822.

In step S1908, the CPU 817 determines whether or not an operation signal from the operation unit 822 is a signal to replace the medium and continue retrieval. If the operation signal is a signal to replace the medium and continue retrieval, the operation proceeds to step S1909. If a different operation signal is input, the operation proceeds to step S1910 where the CPU 817 resets the retrieval in progress flag and stores the flag 1310 in the RAM 816 or the ROM 818 functioning as the flag storage unit 1302.

In step S1909, the CPU 817 displays a message prompting the user to replace the image storage medium on the display unit 820. When the CPU 817 confirms that the image storage medium 1003a was removed from the IF 831 and replaced with another image storage medium 1003b, it continues the image retrieval processing (S1901 to S1908) for the image storage medium 1003b following the replacement.

Figure 20:
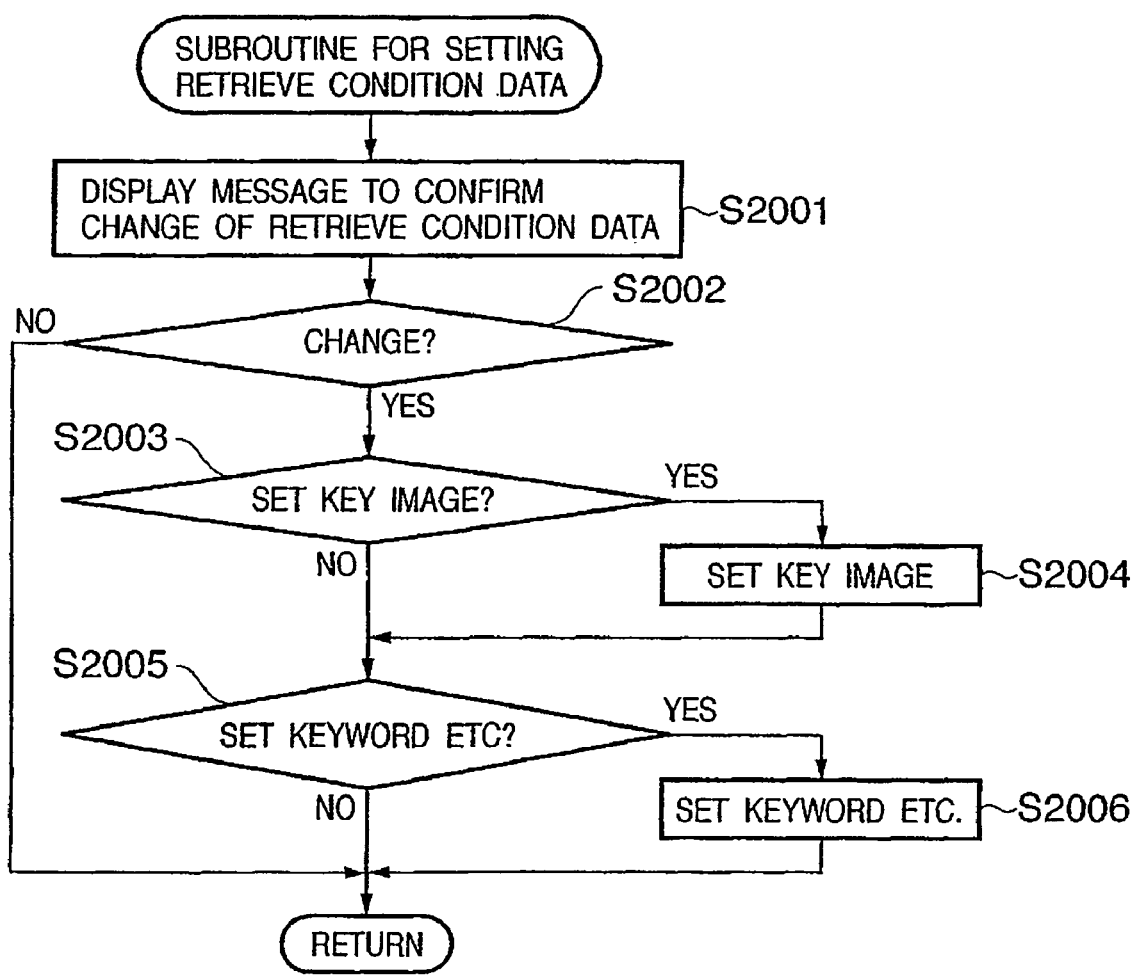
FIG. 20 is an illustrative flowchart relating to a subroutine for setting retrieve condition data according to the embodiments.

FIG. 20 is an illustrative flowchart relating to a subroutine for setting retrieve condition data of this embodiment. This subroutine corresponds to step S1902.

In step S2001, the CPU 817 displays a message to confirm whether or not to change (or newly create) retrieve condition data on the display unit 820. In this connection, the CPU 817 may read the retrieve condition data 1007 that is currently set and display it on the display unit 820.

In step S2002, the CPU 817 determines whether or not an operation signal from the operation unit 822 is a signal to change the retrieve condition data 1007. If the signal is one to change the retrieve condition data 1007, the operation proceeds to step S2003, and if the signal is otherwise the operation exits the subroutine.

In step S2003, the CPU 817 determines whether or not to set a key image. For example, the CPU 817 displays a message on the display unit 820 to inquire whether or not to set a key image, and waits for an instruction from the operation unit 822. If an instruction is received to set a key image, the operation proceeds to step S2004 to set a key image. The CPU 817 may also create a key image based on handwritten input from the operation unit 822, or may set image data that is stored on any storage unit as a key image.

In step S2005, the CPU 817 determines whether or not to set a keyword or the like. For example, the CPU 817 displays a message on the display unit 820 to inquire whether or not to set a keyword, and waits for an instruction from the operation unit 822. If an instruction is received to set a keyword, the operation proceeds to step S2006 to set a character string as the keyword. The character string can be input from the operation unit 822.

Figure 21:
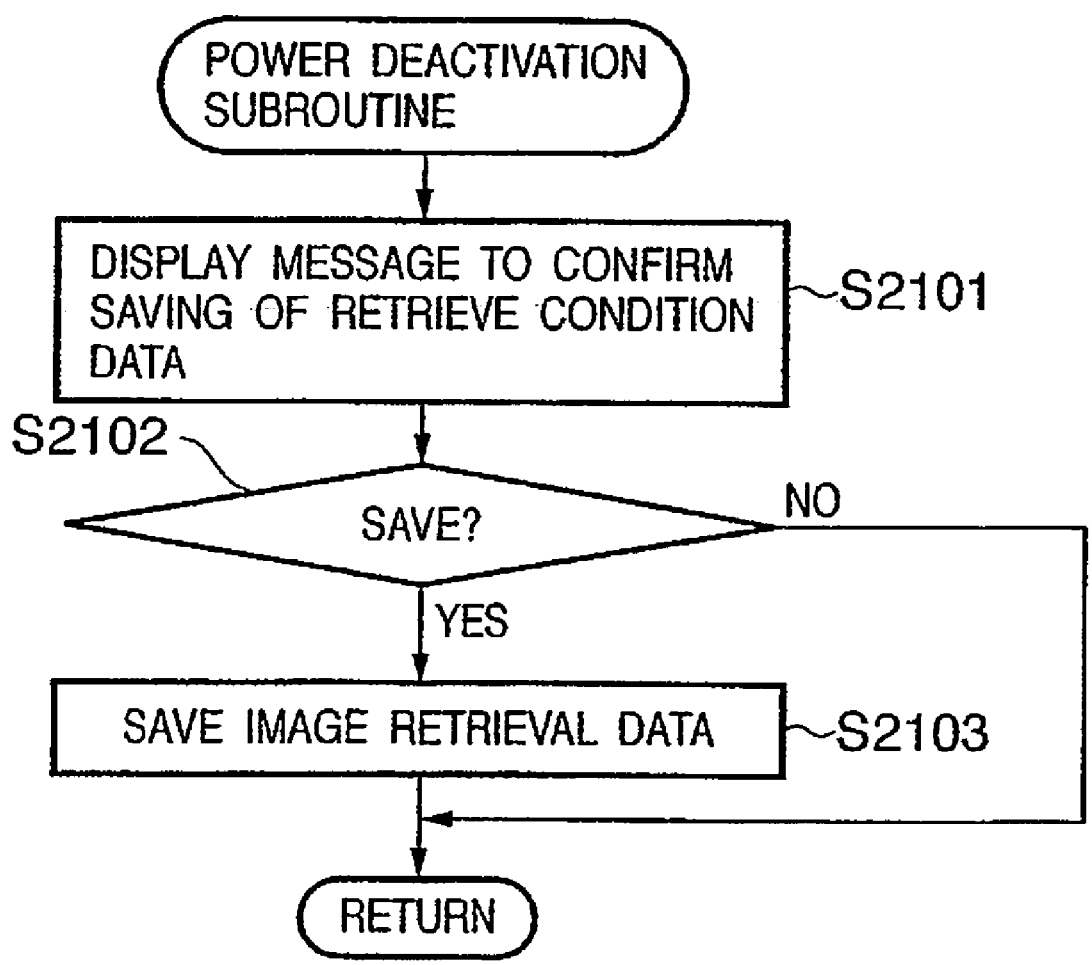
FIG. 21 is an illustrative flowchart relating to a power deactivation subroutine according to the embodiments.

FIG. 21 is an illustrative flowchart for a power deactivation subroutine of this embodiment. This subroutine is activated when an instruction to deactivate the power was received as the result of an operation of the power switch 822C. This subroutine can be applied in a case in which the retrieve condition storage unit 1006 is the RAM 816 or the like that volatilizes once power is not supplied when the power is deactivated. Therefore, this subroutine may be omitted when the retrieve condition storage unit 1006 is the ROM 818 or a RAM that is energized even when the power of the main unit is deactivated.

In step S2101, the CPU 817 displays a message on the display unit 820 to inquire whether or not to save the retrieve condition data 1007. It then waits for an instruction from the operation unit 822.

In step S2102, the CPU 817 determines whether or not the operation signal from the operation unit 822 is a save instruction. In the signal is a save instruction the operation proceeds to step S2103, and if the signal is not a save instruction the CPU 817 outputs a deactivate signal to the power supply circuit.

In step S2103, the CPU 817 reads the retrieve condition data 1007 from the RAM 816 and writes it in the ROM 818 functioning as the non-volatile storage unit 1103. Thus, the retrieve condition data 1007 can be saved.

Figure 22:
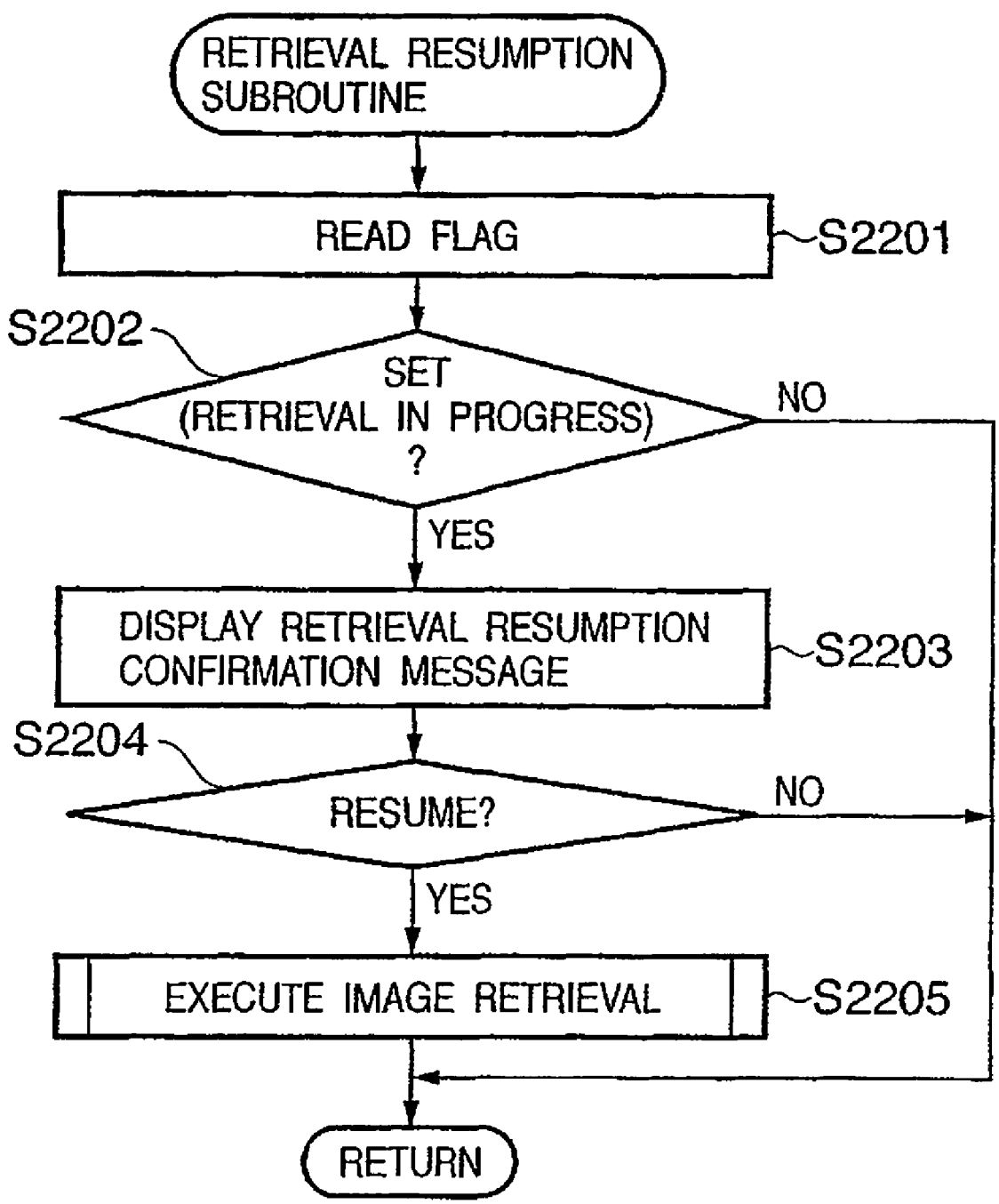
FIG. 22 is an illustrative flowchart relating to a retrieval resumption subroutine according to the embodiments.

FIG. 22 is an illustrative flowchart for a retrieval resumption subroutine of this embodiment. This flowchart is executed for processing to activate the power (S1801).

In step S2201, the CPU 817 reads the retrieval in progress flag 1310 from the flag storage unit 1302 (ROM 818 or the like).

In step S2202, the CPU 817 determines whether or not the flag is set (retrieval is in progress). If retrieval is in progress, the operation proceeds to step S2203, and if retrieval is not in progress the operation exits the subroutine.

In step S2203, the CPU 817 displays a confirmation message to inquire whether or not to resume retrieval on the display unit 820, and waits for an operation signal from the operation unit 822.

In step S2204, the CPU 817 determines whether or not an operation signal from the operation unit 822 is a signal to resume the retrieval. If the signal is one to resume the retrieval, the operation proceeds to step S2205 to execute the image retrieval processing (FIG. 19). If the signal is not one to resume the retrieval, the operation exits this subroutine.

Figure 23:
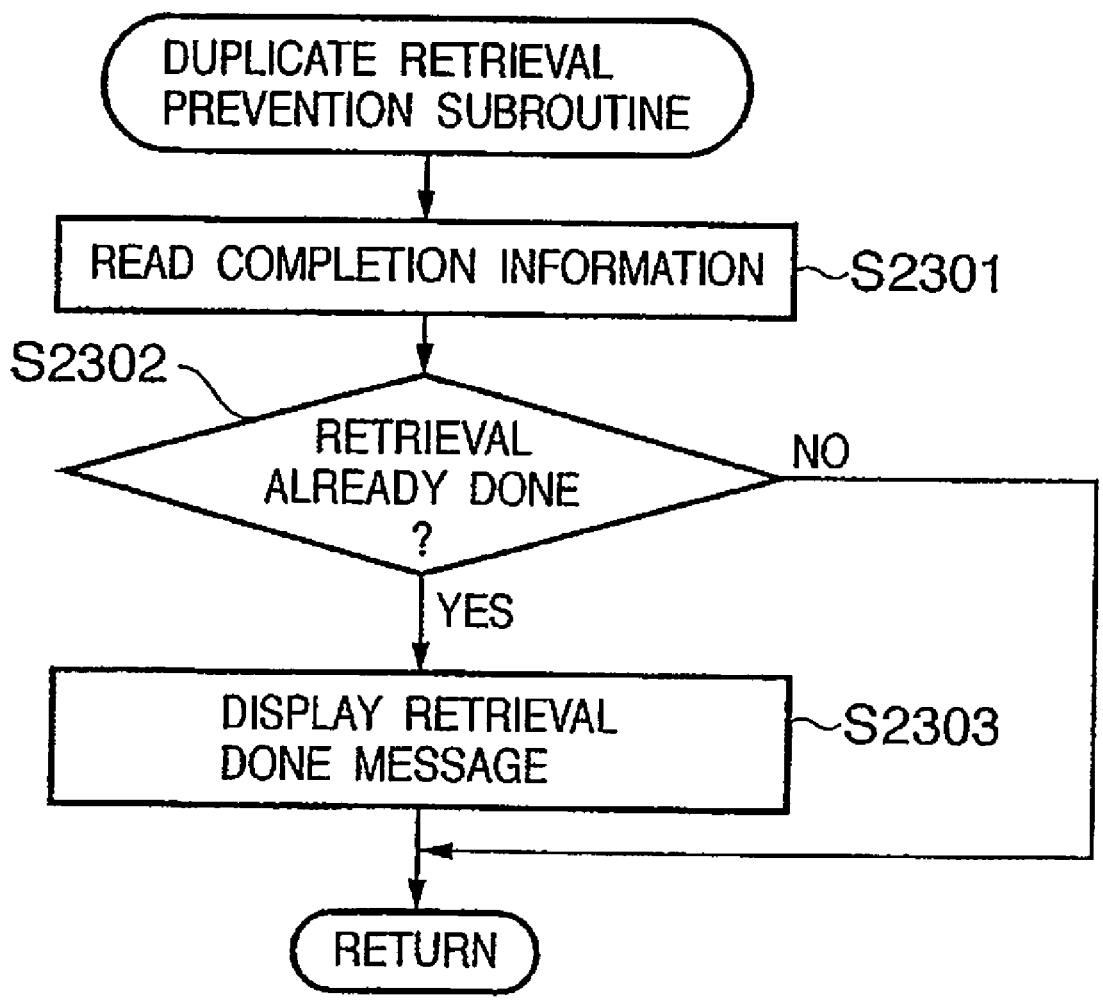
FIG. 23 is an illustrative flowchart relating to a duplicate retrieval prevention subroutine according to the embodiments.

FIG. 23 is an illustrative flowchart relating to a duplicate retrieval prevention subroutine of this embodiment. This subroutine can be executed in the initial part of the image retrieval subroutine (FIG. 19) or at the time of replacement of an image storage medium.

In step S2301, the CPU 817 reads the completion information 1610 from the image storage medium 1003 that is currently connected to the apparatus.

In step S2302, the CPU 817 determines whether or not the completion information 1610 is information indicating that the retrieval operation has already been done for the data in question. For example, if the identification information included in the completion information 1610 and the identification information of the retrieve condition data 1007 stored in the retrieve condition storage unit 1006 match, the CPU 817 can determine that the retrieval operation was already done for the data in question. If it is determined that the retrieval operation has already been done, the operation proceeds to step S2303, and if it is determined that the retrieval operation has not been done, the operation exits the subroutine.

In step S2303, the CPU 817 displays a message on the display unit 820 to indicate that the retrieval operation was already done for the data in question. In this manner, duplicate retrieval operations can be avoided.

Figure 24:
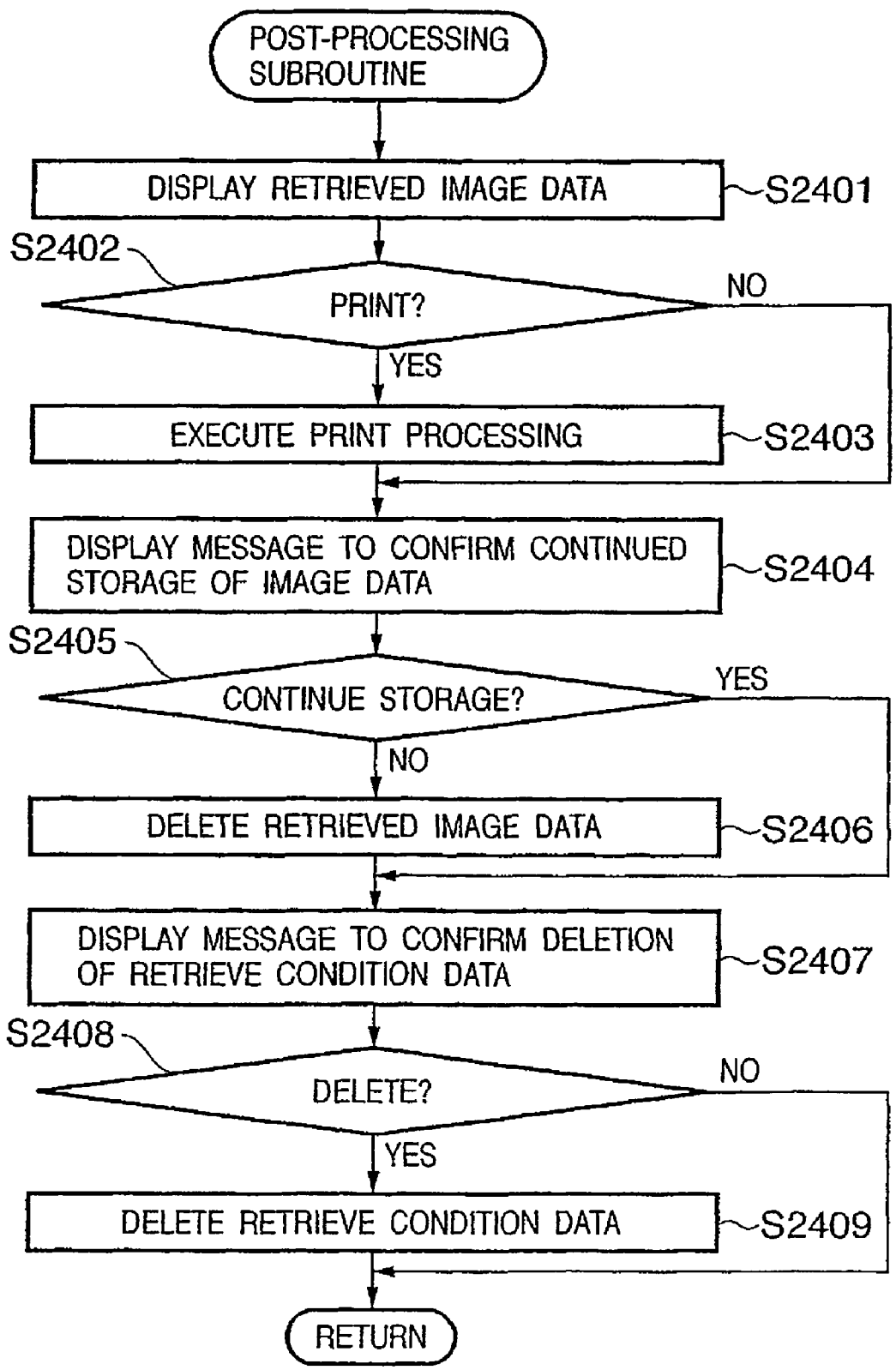
FIG. 24 is an illustrative flowchart relating to a post-processing subroutine according to the embodiments.

FIG. 24 is an illustrative flowchart relating to a post-processing subroutine of this embodiment. This subroutine corresponds to step S1804 described above.

In step S2401, the CPU 817 displays retrieved image data on the display unit 820.

In step S2402, the CPU 817 determines whether an operation signal from the operation unit 822 is an instruction to execute printing. If the signal is an instruction to execute printing, the operation-proceeds to step S2403 where the CPU 817 executes printing processing for the retrieved image data. For example, when a printer is connected as the other information device 850, the CPU 817 sends print job data to the printer to conduct printing.

In step S2404, the CPU 817 displays a message on the display unit 820 to inquire whether or not to store the retrieved image data on the storage unit 1008 that is incorporated into the imaging apparatus.

In step S2405, the CPU 817 determines whether an operation signal from the operation unit 822 is an instruction to store the retrieved image data or an instruction to delete the data. If the instruction is not one to continue to store the image data (i.e. if it is a delete instruction), the operation proceeds to step S2406 to delete the retrieved image data that is temporarily stored on the RAM 816 or ROM 818. If the instruction is one to store the data, the operation skips the deletion processing and proceeds to step S2407. In this connection, when there is a plurality of retrieved image data, a part thereof may be selected for deletion or all of the data may be deleted as one batch.

In step S2407, the CPU 817 displays a confirmation message on the display unit 820 to inquire whether to delete the retrieve condition data 1007.

In step S2408, if an operation signal from the operation unit 822 is an instruction to delete the data, the operation proceeds to step S2409 to delete the retrieve condition data 1007 from the retrieve condition storage unit 1006. In contrast, if the operation signal is not an instruction to delete the data (if it is an instruction to continue storage), the operation skips the deletion processing.

Other Embodiment

Although various embodiments of this invention have been described in the foregoing, the invention is not limited to these embodiments and various modifications can be made to these embodiments without departing from the technical concept of this invention.

For example, the invention may comprise a sequential mode whereby, when storing retrieved image data in the non-volatile internal storage unit 1008, the CPU 817 stores the data while confirming with the user whether or not to store each image data, respectively, and a mode that automatically stores all the retrieved image data.

Further, for the retrieved image data 1009 stored in the non-volatile internal storage unit 1008, when a playback mode is selected by use of a mode selection dial or the like, the CPU 817 may read the retrieved image data and display it on the display unit 820. Thus, a user can freely view retrieved image data at an arbitrary timing after an image retrieval operation. The CPU 817 may also read a plurality of retrieved image data at the same time and arrange two or more of the thus read plurality of retrieved image data for display. Naturally, a user can delete specific image data among the displayed image data by issuing a delete instruction from the operation unit 822. Thus, a user can select an unwanted retrieved image data.

Further, when an instruction to transfer retrieved image data is input from the operation unit 822, the CPU 817 may write the retrieved image data in question on the image storage unit 1003. Thus, a user can organize retrieved image data by storing the data on a single image storage unit 1003.

Furthermore, at the time of storing on the internal storage unit 1008 or the image storage unit 1003 retrieved image data that the user wishes to preserve, the CPU 817 may store these retrieved image data by attaching thereto a common keyword. In this connection, the retrieve condition data 1007 may be used instead of a keyword. Thus, in a case in which retrieved image data are stored for each of a plurality of retrieve condition data, it is easy for the user to recognize which retrieve condition was used to retrieve the particular retrieved image data. In this connection, each time an image retrieval operation is executed the CPU 817 can create a separate folder and store the retrieved image data in that folder, to thereby enable retrieved image data to be distinguished according to the different folders. If the retrieve condition data is also stored in the relevant folder, it will be easier for the user to understand the correspondence between the retrieved image data and the retrieve condition.

Further, at the time of printing retrieved image data, if the CPU 817 carries out control to print the retrieve condition data together with the retrieved image data, it will be easy for the user to visually confirm the correspondence between the retrieved image data and the retrieve condition. Since a user can easily forget an image retrieval condition following the passage of time, printing the retrieve condition data together with the retrieved image data is particularly effective in such a case.

Various embodiments of this invention have been described above, and the present invention may be applied to a system constituted by a plurality of devices or to an apparatus comprising a single device.

Furthermore, the invention can be implemented by supplying a software program which implements the functions of the foregoing embodiments (for these embodiments, a program corresponding to the flowchart shown in any of FIG. 3, FIG. 7, and FIG. 15 to FIG. 18) directly or indirectly to a system or apparatus, reading the supplied program code with a computer of the system or apparatus, and then executing the program code.

Accordingly, since the functions and processing of the present invention are implemented by computer, the program code itself installed in the computer also implements the present invention. In other words, the claims of the present invention also cover a computer program for the purpose of implementing the above-described functions and processing of the present invention.

In this case, so long as the system or apparatus has the functions of the program, the program may be executed in any form, e.g., as object code, a program executed by an interpreter, or script data supplied to an operating system.

Examples of storage medium that can be used for supplying the program are a flexible disk, a hard disk, an optical disk, a magneto-optical disk, an MO, a CD-ROM, a CD-R, a CD-RW, a magnetic tape, a non-volatile memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions and processing of the present invention by computer is also covered by the claims of the present invention.

Further, it is also possible to encrypt and store the program of the present invention on a storage medium such as a CD-ROM, distribute the storage medium to users, allow users to meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program code by computer, an operating system or the like running on the computer may perform all or a part of the actual processing based on the instructions of the program so that the functions of the foregoing embodiments can be implemented by this processing.

Further, after the program code read from the recording medium is written to a function expansion board inserted into the computer or to a memory provided in a function expansion unit connected to the computer, a CPU or the like mounted on the function expansion board or function expansion unit may perform all or a part of the actual processing based on the instructions of the program so that the functions of the foregoing embodiments can be implemented by this processing.

The present invention is not limited to the above embodiments and various changes and modifications can be made within the sprit and scope of the present invention. Therefore, to apprise the public of the scope of the present invention the following claims are made.

CLAIM OF PRIORITY

This application claims priority from Japanese Patent Application Nos. 2004-173009 and 2004-172998 both filed on Jun. 10, 2004, the entire contents of which are hereby incorporated by reference herein.

The invention claimed is:

1. An imaging apparatus for recording captured images, the imaging apparatus comprising:
   a connector component that connects an image storage component, that stores a plurality of image data, to the imaging apparatus in a removable condition;
   a retrieve condition storage component that stores retrieve condition data for use as a retrieve condition when performing image retrieval;
   a retrieval component that retrieves a retrieval result by searching for image data that matches or is similar to the retrieve condition data from among the plurality of image data stored in the image storage component connected to the connector component;
   an internal storage component that stores the retrieval result retrieved by the retrieval component; and
   a determination component that determines whether image data stored in another image storage component connected to the connector component, instead of the image storage component, has been retrieved by said retrieval component,
   wherein, the retrieval component further retrieves a retrieval result from among a plurality of image data stored in said another image storage component using the common retrieve condition data which has been used with respect to the image storage component in a case where the determination component determines that image data stored in said another image storage component has not been retrieved, and the retrieval component does not again perform retrieval of a retrieval result on said another image storage component in a case where the determination component determines that image data stored in said another image storage component has been retrieved, and
   wherein the internal storage component accumulatively stores the retrieval results retrieved by the retrieval component until there is an explicit delete instruction.

2. The imaging apparatus according to claim 1, further comprising:
   a power deactivation switch that instructs that the power of the imaging apparatus be deactivated;
   a non-volatile storage component for saving the retrieve condition data when there is an instruction to deactivate the power from the power deactivation switch; and
   a read/write control component that, when the power to the imaging apparatus is reactivated, reads the retrieve condition data from the non-volatile storage component to write the retrieve condition data in the retrieve condition storage component.

3. The imaging apparatus according to claim 1, further comprising:
   a non-volatile storage component;
   a selection component that selects whether or not to store the retrieve condition data on the non-volatile storage component when the image retrieval processing ends; and
   a write control component that writes the retrieve condition data on the non-volatile storage component when a selection is made to store the retrieve condition data on the non-volatile storage component.

4. The imaging apparatus according to claim 1 further comprising:
   a flag control component that sets a flag showing that retrieval is in progress at the start of image retrieval processing by the retrieval component and resets the flag at the end of the image retrieval processing;
   a flag determination component that determines whether the flag is set when the power of the imaging apparatus is activated;
   a first message display component that, when the flag had been set, displays a message to inquire whether or not to continue the image retrieval processing;
   a first input component that inputs an instruction as to whether or not to continue the image retrieval processing; and
   a first continuation instruction component that, in a case where an instruction to continue the image retrieval processing is input, instructs the retrieval component to continue the image retrieval processing.

5. The imaging apparatus according to claim 1, further comprising:
   a second message display component that, when an instruction is given to execute the image retrieval processing, displays a message to inquire whether or not to change the retrieve condition data;
   a second input component that inputs an instruction to change the retrieve condition data; and
   a change component that changes the retrieve condition data when an instruction is input to change the retrieve condition data.

6. The imaging apparatus according to claim 1, further comprising:
   a third message display component that, when the image retrieval processing ends for an arbitrary image storage component, displays a message to inquire whether or not to replace the image storage component with a different image storage component and continue the image retrieval processing;
   a third input component that inputs an instruction as to whether or not to continue the image retrieval processing; and
   a second continuation instruction component that, when an instruction to continue the image retrieval processing is input and the different image storage component is connected to the connector component, instructs the retrieval component to continue the image retrieval processing.

7. The imaging apparatus according to claim 1, further comprising:
   a writing component that, when the image retrieval processing based on the retrieve condition data ends, writes completion information indicating the completion of the image retrieval processing based on the retrieve condition data onto the image storage component that is connected to the connector component;
   a detection component that detects that the image storage component on which the completion information is stored is connected to the connector component; and
   a fourth message display component that, when the connection is detected by the detection component, displays a message indicating that the image retrieval processing for the retrieve condition data has been completed.

8. A method for controlling an imaging apparatus that records captured images, the method comprising the steps of:

connecting an image storage component, that stores a plurality of image data, to the imaging apparatus in a removable condition;

reading, from a retrieve condition storage component of the imaging apparatus, retrieve condition data for use as a retrieve condition when performing image retrieval;

retrieving a retrieval result by searching for image data that matches or is similar to the retrieve condition data from among the plurality of image data stored in the image storage component; and storing the retrieval result in an internal storage component of the imaging apparatus; and determining whether image data stored in another image storage component connected to the imaging apparatus, instead of the image storage component, has been retrieved, wherein the step of retrieving the retrieval result further comprises the step of further retrieving a retrieval result from among a plurality of image data stored in said another image storage component using the common retrieve condition data which has been used with respect to the image storage component in a case where it is determined that image data stored in said another image storage component has not been retrieved, and the retrieval component does not again perform retrieval of a retrieval result on said another image storage component in a case where it is determined that image data stored in said another image storage component has been retrieved, and wherein retrieved retrieval results are accumulatively stored in the internal storage component until there is an explicit delete instruction.

9. A computer-readable storage medium storing a computer-executable computer program that causes a computer equipped with an image storage component that stores a plurality of image data and is connected to the computer in a removable condition, a retrieve condition storage component that stores retrieve condition data such as a key image or a keyword for use as a retrieve condition when performing image retrieval, and an internal storage component that stores a retrieval result, to execute a method comprising the steps of:

reading, from the retrieve condition storage component, retrieve condition data for use as a retrieve condition;

retrieving a retrieval result by searching for image data that matches or is similar to the retrieve condition data from among the plurality of image data stored in the image storage component; and storing the retrieval result in the internal storage component of the computer; and determining whether image data stored in another image storage component connected to the imaging apparatus, instead of the image storage component, has been retrieved, wherein the step of retrieving a retrieval result further comprises the step of further retrieving a retrieval result from among a plurality of image data stored in said another image storage component using the common retrieve condition data which has been used with respect to the image storage component in a case where it is determined that image data stored in said another image storage component has not been retrieved, and the retrieval of a retrieval result is not again performed on said another image storage component in a case where it is determined that image data stored in said another image storage component has been retrieved, and wherein retrieved retrieval results are accumulatively stored in the internal storage component until there is an explicit delete instruction.

* * * * *